(12) United States Patent
Helliker et al.

(10) Patent No.: US 11,030,056 B2
(45) Date of Patent: Jun. 8, 2021

(54) DATA SYSTEM FOR MANAGING SYNCHRONIZED DATA PROTECTION OPERATIONS AT NODES OF THE DATA SYSTEM, SOURCE NODE AND DESTINATION NODE, AND COMPUTER PROGRAM PRODUCT FOR USE IN SUCH DATA SYSTEM

(71) Applicant: Hitachi Vantara LLC, Santa Clara, CA (US)

(72) Inventors: Fabrice Helliker, Dorset (GB); James Stormont, Dorset (GB); Andrew Cockayne, Dorset (GB); Simon Chappell, Dorset (GB)

(73) Assignee: HITACHI VANTARA LLC, Santa Clara, CA (US)

( * ) Notice: Subject to any disclaimer, the term of this patent is extended or adjusted under 35 U.S.C. 154(b) by 793 days.

(21) Appl. No.: 15/303,234

(22) PCT Filed: Oct. 20, 2014

(86) PCT No.: PCT/US2014/061325
§ 371 (c)(1),
(2) Date: Oct. 11, 2016

(87) PCT Pub. No.: WO2016/064372
PCT Pub. Date: Apr. 28, 2016

(65) Prior Publication Data
US 2017/0031779 A1 Feb. 2, 2017

(51) Int. Cl.
*G06F 11/14* (2006.01)
*G06F 16/27* (2019.01)
*H04L 29/08* (2006.01)

(52) U.S. Cl.
CPC ......... *G06F 11/1464* (2013.01); *G06F 16/27* (2019.01); *H04L 67/1095* (2013.01);
(Continued)

(58) Field of Classification Search
CPC ............... G06F 11/1464; G06F 16/27
(Continued)

(56) References Cited

U.S. PATENT DOCUMENTS

2002/0035630 A1* 3/2002 Stumer ............. H04Q 11/0457
709/227
2007/0106857 A1 5/2007 Koning et al.
(Continued)

OTHER PUBLICATIONS

International Search Report of PCT/US2014/061325 dated Jun. 17, 2015.

*Primary Examiner* — Tony Mahmoudi
*Assistant Examiner* — Michael Le
(74) *Attorney, Agent, or Firm* — Mattingly & Malur, PC

(57) ABSTRACT

The present application relates to a data system for managing synchronized data protection operations at plural nodes of the data system, the data system including at least a first node and a second node, wherein the first node is communicably connected to the second node and is configured to operate on the basis of first sequence information, the first node being configured to perform a first data protection operation and to transmit a synchronization notification to the second node on the basis of respective instructions included in the first sequence information, and wherein the second node is configured to receive the synchronization notification from the first node and to operate on the basis of second sequence information, the second node being configured to perform a second data protection operation upon receipt of the synchronization notification on the basis of a respective instruction included in the second sequence information.

4 Claims, 21 Drawing Sheets

(52) U.S. Cl.
CPC .......... *H04L 67/1097* (2013.01); *H04L 67/32* (2013.01); *G06F 2201/84* (2013.01)

(58) Field of Classification Search
USPC ........................................................ 707/634
See application file for complete search history.

(56) References Cited

U.S. PATENT DOCUMENTS

| | | | | |
|---|---|---|---|---|
| 2009/0254693 | A1* | 10/2009 | Karamanolis | G06F 11/1458 711/100 |
| 2009/0313311 | A1* | 12/2009 | Hoffmann | G06F 11/2097 |
| 2010/0198949 | A1 | 8/2010 | Elrom et al. | |
| 2012/0158659 | A1* | 6/2012 | Marathe | G06F 16/907 707/639 |
| 2012/0254110 | A1* | 10/2012 | Takemoto | G06F 16/184 707/624 |
| 2012/0271797 | A1* | 10/2012 | Patil | G06F 16/1824 707/639 |
| 2012/0306899 | A1* | 12/2012 | Sandmel | G06T 1/20 345/522 |
| 2013/0262374 | A1 | 10/2013 | Helliker et al. | |
| 2013/0262389 | A1* | 10/2013 | Rathof | G06F 11/1466 707/642 |

\* cited by examiner

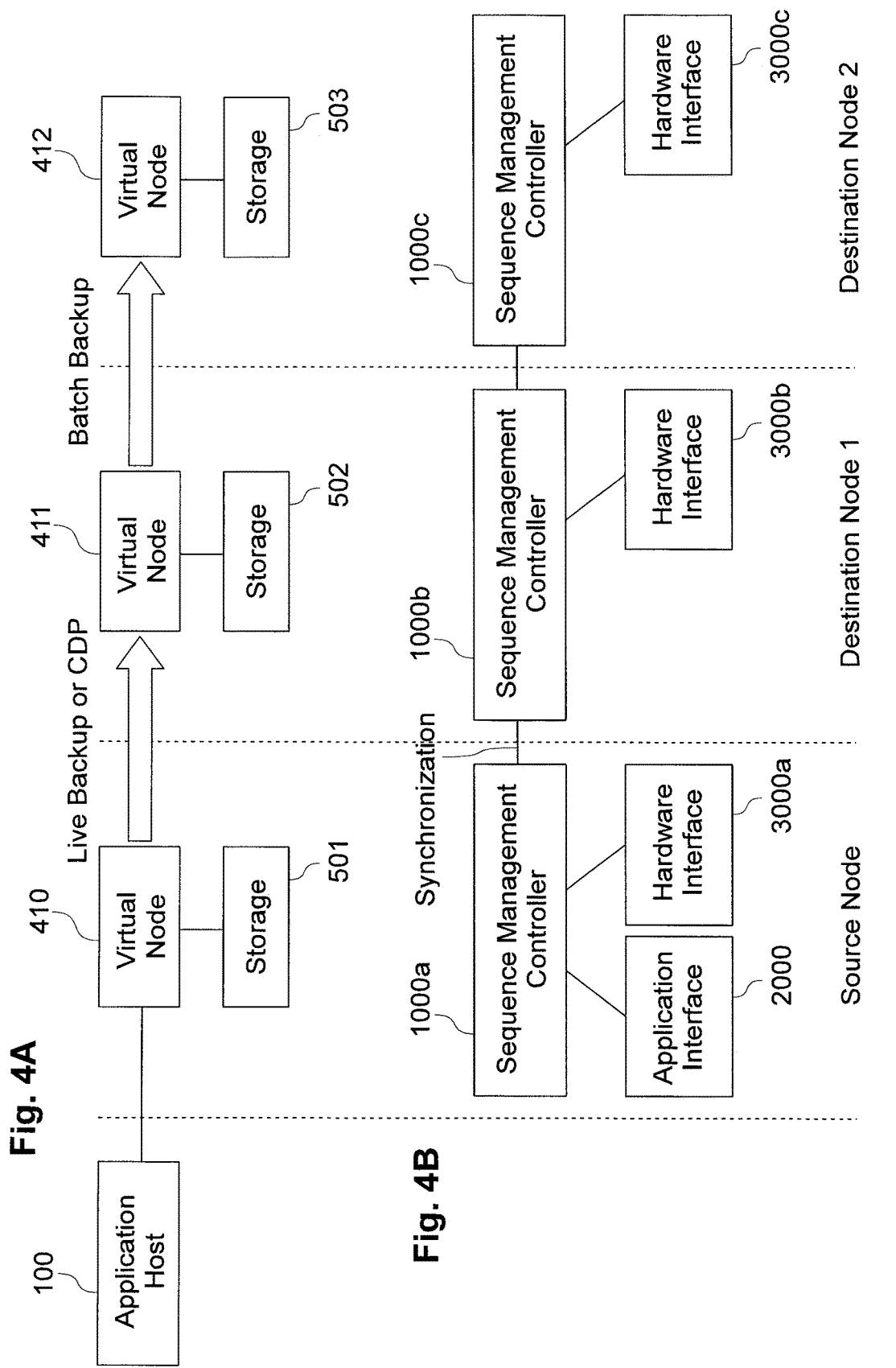

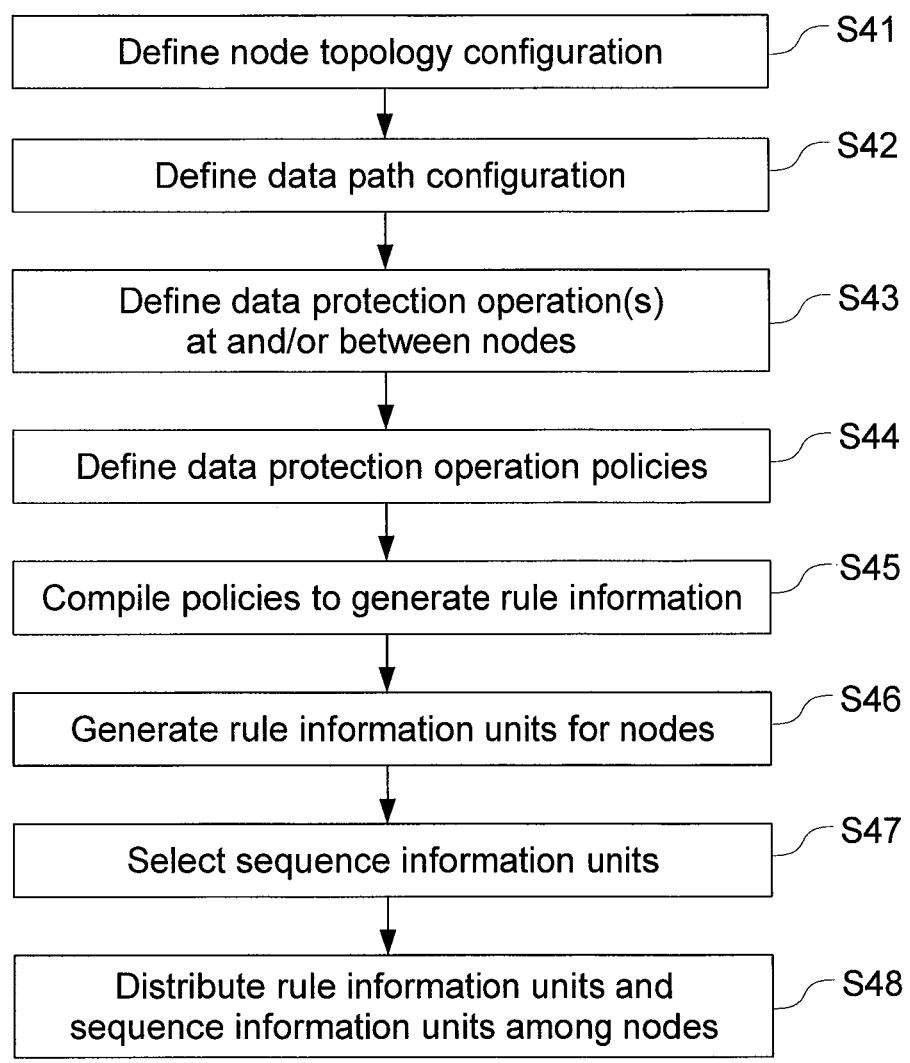

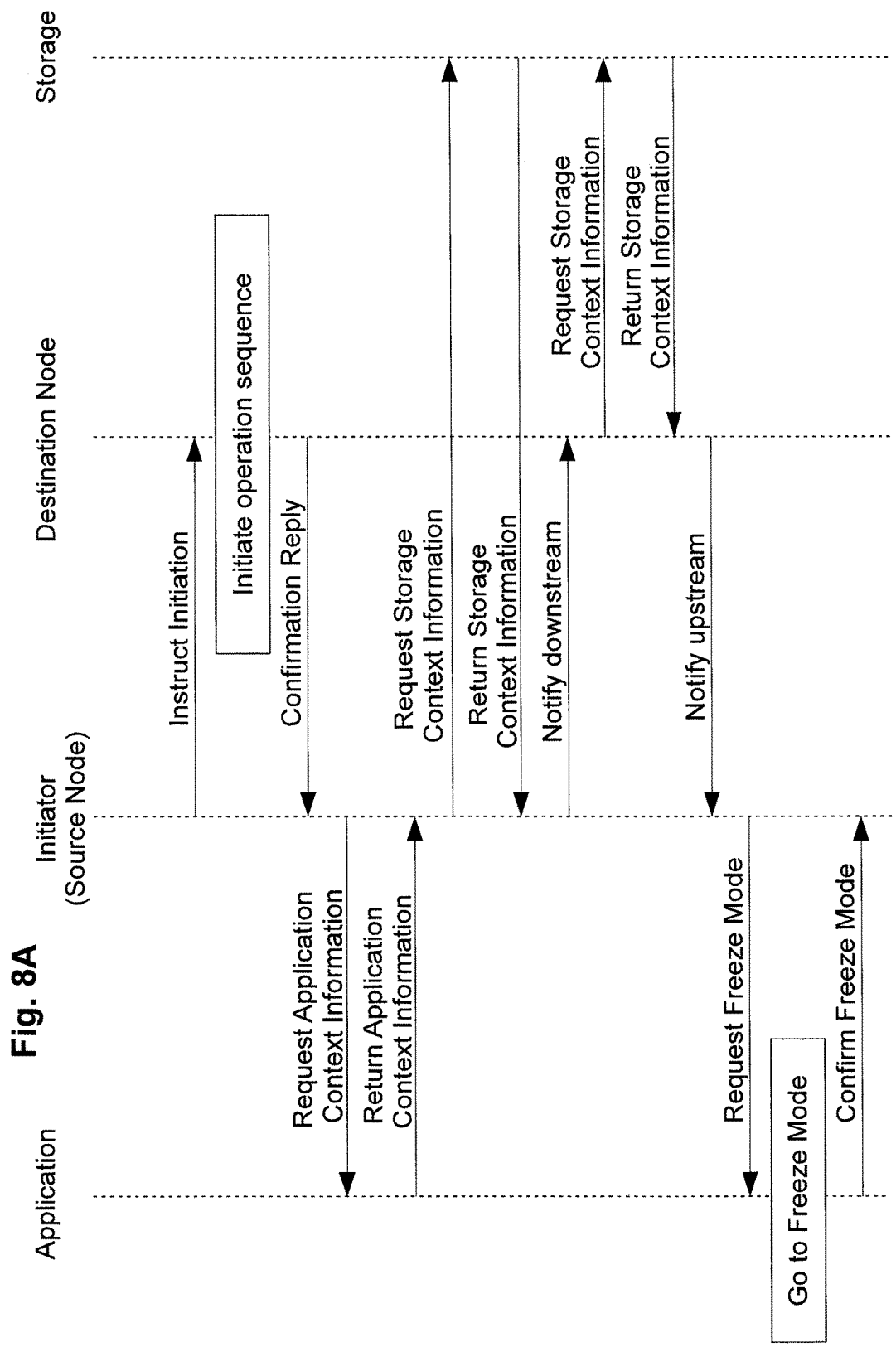

DATA SYSTEM FOR MANAGING SYNCHRONIZED DATA PROTECTION OPERATIONS AT NODES OF THE DATA SYSTEM, SOURCE NODE AND DESTINATION NODE, AND COMPUTER PROGRAM PRODUCT FOR USE IN SUCH DATA SYSTEM

Some embodiments of the present application relate to a data system for managing synchronized data protection operations at plural nodes of the data system, and to source and destination nodes in such data system. Some embodiments relate to an apparatus and a computer program product for managing synchronized data protection operations in a data system.

BACKGROUND

Backup systems for computers are well known. Backup systems provide for the redundant storage of data, so that a computer can be restored to a previous state after an event that results in the loss of data on the computer. As those skilled in the art will appreciate, data stored on a computer can be very valuable and the loss of data can result in severe economic hardship.

Banks, stock brokerages, and other companies commonly store large amounts of data on computers. This data is vital to the day-to-day operations of such businesses. For example, it is easy to appreciate that a bank's account records, which are commonly stored in a computer, are necessary in order to facilitate the regular business transactions of the bank.

Events such as fires, earthquakes, thefts, and hard disk failures may result in the loss of valuable computer data. If the only copy of a company's data is stored on the affected computer, then the loss may be permanent and may have catastrophic consequences.

However, if the data was previously backed up, then the data may be restored, so that the routine operations of the business may continue with a minimum of disruption. Thus, the backing up of data stored on computers is considered necessary and has generally become routine.

Backup systems typically comprise a repository and software which drives the repository. The software is configured so as to copy all or a portion of the data from a computer to media of the repository. Various different types of repositories are in widespread use. Local backup drives and digital virtual devise (DVD or DVD ROMO repositories are commonly used with smaller data storage requirements and tape storage or large disk drives are used on computers or in networks with large data storage requirements.

The networking of computers had, for a time, simplified the backup process by providing a central data storage location for multiple computers. That is, several client computers were commonly connected to a server and all of the data used by the client computers was stored in a central location by the server. Thus, only the single server needed to be backed up in order to adequately safeguard the data used by all of the client computers.

However, the data storage capacity of the client computers continues to increase and the number of clients on networks has increased, it eventually became more practical to store the large amounts of data required by client computers at the client computers themselves, rather than at the servers where bandwidth restrictions would limit the client computer's access to the data. Thus, we are once again faced with having to backup multiple client computers.

Additional legal and statutory requirements have also been put in place by government organizations through regulations and even local city and state ordinances have been placed requirements on how long data needs to be archived and saved and the type of data that needs to be archived and saved. For example, financial data may need to be archived every day and stored for a period of seven years where legal data can be archived every week and stored for a period of five years. Therefore, in a contemporary network, data may be backed up from a plurality of clients or even locations on a client computer, on a selected one of a plurality of different repositories at a plurality of different locations.

The traditional backup solutions have attempted to address some of these issues by providing the information technology manager (IT Manager) with the ability to manually setup policies for specific data to be saved at a specific location on a specific repository designed for long term storage on a very granular level. Unfortunately, this process is very tedious and is very impractical once one realizes how many types of data are on any given client, the numbers of regulations are on each type of data, how often the data must be archived and the best location to archive the data based on the requirements. Therefore, it is desirable for the IT Manager to have an integrated data management system that has a central command module that enables the ability to establish data sources, in data paths to repositories with policies in a visual manner that enables a system view with the ability to also view on a granular level.

SUMMARY

In view of the above, it is an object to provide a data system which allows to efficiently, reliably, conveniently set up a system of one or more data protection policies for one or more data protection operations to be performed in even complex data protection topologies including plural nodes and plural policies, preferably in a synchronized manner.

According to aspects of some exemplary embodiments, there is proposed a data system for managing synchronized data protection operations at plural nodes of the data system.

According to aspects of some exemplary embodiments, the data system includes at least a first node (e.g. source node) and a second node (e.g. destination node downstream of the source node), and optionally including one or more further nodes (e.g. further destination nodes downstream of the first and/or second nodes).

In some embodiments, the first node may exemplarily be communicably connected to the second node and the first node may exemplarily be configured to operate on the basis of first sequence information, which may be locally provided at the first node.

In some embodiments, the first node may be configured to perform a first data protection operation and/or to transmit a synchronization notification to the second node on the basis of respective instructions included in the first sequence information.

In some embodiments, the second node may be configured to receive the synchronization notification from the first node and/or the second node may be configured to operate on the basis of second sequence information.

In some embodiments, the second node may be configured to perform a second data protection operation upon receipt of the synchronization notification on the basis of a respective instruction included in the second sequence information.

In some embodiments, the second node may be configured to transmit a confirmation notification to the first node, preferably when having performed the second data protection operation, on the basis of a respective instruction included in the second sequence information.

In some embodiments, there may be provided one or more further node such as a third node communicably connected to the second node, downstream thereof, and being configured to operate on the basis of third sequence information, which may be locally provided at the third node, wherein a chain of nodes may include the first, second and third node, and optionally further nodes.

In some embodiments, the second node may be configured to transmit a synchronization notification to the third node on the basis of respective instructions included in the second sequence information.

Upon receipt of the synchronization notification from the second node, the third node may be configured to perform a third data protection operation on the basis of a respective instruction included in the third sequence information, and to then transmit a confirmation notification to the second node, preferably when having performed the third data protection operation, on the basis of a respective instructions included in the third sequence information (and optionally after sending further synchronization notifications to one or more further downstream nodes, and upon receiving confirmation notification(s) from these downstream node(s)).

Preferably, the second node may be configured to transmit its confirmation notification to the first node, preferably when having performed the second data protection operation, on the basis of respective instructions included in the second sequence information and upon receiving the confirmation notification from the third node.

In some embodiments, the first and/or second data protection operations may relate to data being associated with at least one application running on an application host.

In some embodiments, the first node may be configured to request to put the at least one application on hold on the basis of a respective instruction included in the first sequence information, preferably prior to performing the first data protection operation and/or preferably prior to transmitting the synchronization notification to the second node.

In some embodiments, the first node may be configured to request to resume the at least one application on the basis of a respective instruction included in the first sequence information, preferably upon receiving the confirmation notification from the second node.

In some embodiments, the first node may be configured to request, on the basis of a respective instruction included in the first sequence information, application context information which preferably indicates one or more logical storage locations of data being related to the at least one application.

In some embodiments, the first node may be configured to request, preferably on the basis of a respective instruction included in the first sequence information, storage context information which preferably indicates one or more physical storage locations of data being related to the at least one application being preferably associated with the one or more logical storage locations indicated in the application context information.

In some embodiments, the first node may be configured to transmit, preferably on the basis of a respective instruction included in the first sequence information, the requested application context information to the second node.

In some embodiments, the second node may be configured to request, preferably on the basis of a respective instruction included in the second sequence information, storage context information which preferably indicates one or more physical storage locations of data being related to the at least one application being associated with the one or more logical storage locations indicated in the application context information.

Alternatively or in addition, in some embodiments, the first node may be configured to translate received application context information into storage context information, which indicates one or more physical storage locations of data being related to the at least one application being associated with the one or more logical storage locations indicated in the application context information, on the basis of a respective instruction included in the first sequence information and on the basis of the application context information, and/or the first node may be configured to transmit the generated storage context information to the second node.

In some embodiments, the first node may be configured, preferably after performing the first data protection operation, to request writing metadata indicative of actions of the first data protection operation and/or to transmit another synchronization notification to the second node on the basis of respective instructions included in the first sequence information.

In some embodiments, the second node may be configured to receive the other synchronization notification from the first node, and/or to request writing metadata indicative of actions of the second data protection operation upon receipt of receive the other synchronization notification and/or to transmit another confirmation notification to the second node on the basis of respective instructions included in the second sequence information.

In some embodiments, each of the first and second data protection operations may include one or more of: a backup operation, a mirror operation, a snapshot operation, a versioning operation, an archiving operation, and a replicate operation.

According to other aspects of some exemplary embodiments, there is proposed a destination node for use in a data system for managing synchronized data protection operations at plural nodes of the data system.

In some embodiments, the destination node may communicably connectable to at least to one upstream node and to at least one downstream node.

In some embodiments, the destination node may be configured to operate on the basis of local sequence information.

In some embodiments, the destination node may be configured to receive a synchronization notification from the at least one upstream node, and/or, upon receipt of the synchronization notification from the at least one upstream node, to perform a data protection operation and/or to transmit a synchronization notification to the at least one downstream node on the basis of instructions included in the local sequence information.

In some embodiments, the destination node may be configured to receive a confirmation notification from the at least one downstream node, and/or, upon receipt of the confirmation notification from the at least one downstream node, to transmit another confirmation notification to the at least one upstream node on the basis of a respective instruction included in the local sequence information.

According to other aspects of some exemplary embodiments, there is proposed a source node for use in a data system for managing synchronized data protection operations at plural nodes of the data system.

In some embodiments, the source node may be communicably connectable to at least to one downstream node and to at least one application.

In some embodiments, the source node may be configured to operate on the basis of local sequence information.

In some embodiments, the source node may be configured to request to put the at least one application on hold on the basis of a respective instruction included in the local sequence information, and/or to perform a data protection operation and/or to transmit a synchronization notification to the at least one downstream node, preferably after requesting to put the at least one application on hold, preferably on the basis of respective instructions included in the local sequence information.

In some embodiments, the source node may be configured to receive a confirmation notification from the at least one downstream node, and/or to request to resume the at least one application on the basis of a respective instruction included in the local sequence information preferably upon receiving the confirmation notification from the at least one downstream node.

According to other aspects of some exemplary embodiments, there is proposed a computer program product for managing synchronized data protection operations in a data system including a plurality of nodes adapted to execute data protection operations, the computer program product comprising computer-readable program instructions which, when running on or loaded into an apparatus, cause the apparatus to execute providing first sequence information to a first node of the data system, the first node being communicably connected to a second node of the data system, and/or providing second sequence information to the second node of the data system.

In some embodiments, the first sequence information may include instructions to be executable by the first node, preferably including an instruction to perform a first data protection operation and/or an instruction to transmit a synchronization notification to the second node.

In some embodiments, the second sequence information may include instructions to be executable by the second node, preferably including an instruction to perform a second data protection operation upon receipt of the synchronization notification from the first node.

BRIEF DESCRIPTION OF DRAWINGS

FIG. 4A exemplarily shows a schematic view of a hardware topology according to an exemplarily defined data protection policy topology.

FIG. 4B exemplarily shows a schematic view of a software unit topology according to the exemplarily defined data protection policy topology of FIG. 4A.

FIG. 4C exemplarily shows a flow chart of a process of setting up a data system in accordance with exemplary embodiments.

FIGS. 8A to 8C exemplarily illustrate an example of a process in a system comprising one source node and at least one downstream node.

DETAILED DESCRIPTION OF DRAWINGS AND OF PREFERRED EMBODIMENTS

Figure 1:
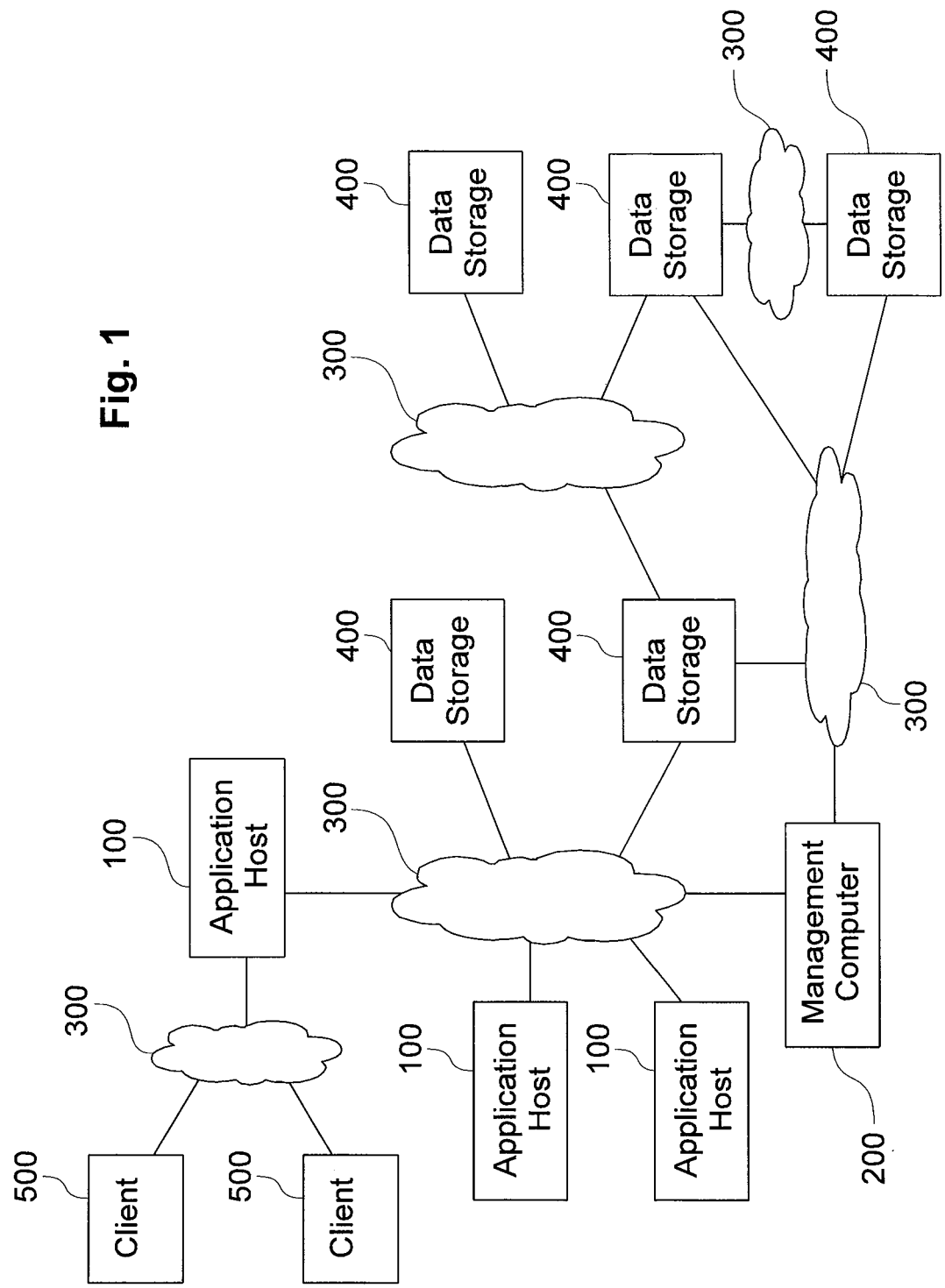
FIG. 1 exemplarily shows a schematic view of a data system comprising plural application hosts being connected to multiple data storage systems via a communication network.

In the following, preferred aspects and embodiments of the present invention will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more.

When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary.

With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "file system" is a structure of files and directories (folders) stored in a file storage system. Within a file storage system, file systems are typically managed using a number of virtual storage constructs, and in exemplary embodiments, file systems are managed using a hierarchy of virtual storage constructs referred to as ranges, stripesets, and spans. File system functionality of a file server may include object management, free space management (e.g. allocation) and/or directory management.

A "range" is composed of either a primary SD on its own or a primary/secondary SD pair that are supposed to contain identical data and therefore offer the same storage capacity as a single SD.

A "stripeset" is composed of one or more ranges.

A "span" is composed of one or more stripesets. Thus, a span is ultimately composed of one or more SDs (typically four to fifty SDs). A span can be divided into one or more file systems, with each file system having a separate name and identifier and potentially different characteristics (e.g., one file system may be formatted with 32 KB blocks and another with 4 KB blocks, one file system may be Worm and another not, etc.). Each file system on the span is formatted, mounted, and unmounted separately. File systems may be created and deleted in any order and at any time. File systems typically can be configured to expand automatically (or alternatively to prevent or restrict auto-expansion) or can be expanded manually.

A "block" or "storage block" is a unit of storage in the file system that corresponds to portion of physical storage in which user data and/or system data is stored. A file system object (discussed below) generally includes one or more blocks. A "data block" is a unit of data (user data or metadata) to be written to one storage block.

An "archive" is a copy or partial copy of data created for long-term retention.

The operation of "asynchronous replication" refers to data transactions that are written to storage and then sent to a destination for backup or replication purposes. Data transactions are held in a memory before being sent over a network and/or to the destination. Also, the transaction may be held in a log file to protect against data loss in the event of system failure. Transactions may be sent from memory and/or from the log file to the destination.

"Backup" refers to a copy or partial copy of data created for operational recovery and/or disaster recovery. Backups may represent full copies of the whole data to be protected, or represent only differential backups storing differences and/or changes of data since an earlier backup. Also, backups may be handled continuously, e.g. by continuous data protection (CDP) or live backup in which the repository is updated with live updates in a continuous manner with or without indexing. Also, backups may be handled in batches, e.g. periodically, wherein the backup is created in batches. Batch backup may refer to an operation in which a repository is updated periodically or at least repeatedly according to scheduled resynchronizations, e.g. involving a scan of the source data for changes since the last backup and only changed data, changed files and/or changed bytes are transferred to the destination for storing.

A "repository" may be a node that stores data received from a source node, e.g. for live backup, batch backup, versioning and/or archiving. Versioning may refer to a data protection operation in which a version of files, directories, and/or data portions is taken when it changes (e.g. in each time a document is saved in a file, another version is retained and indexed, e.g. creating multiple generations of data according to the change history).

FIG. 1 exemplarily shows a data system comprising plural application hosts 100 being connected to a communication network 300. The communication network 300 is further connected to multiple data storage systems 400.

Each of the application hosts 100 has one or more applications running thereon, and each of the applications uses data stored on one or more of the data storage systems 400 to be accessed via the communication connection through the communication network 300.

In addition, a management computer 200 is connected to the communication network 300. The management computer 300 is configured to allow a system administrator to set up data storage policies for managing the data system and for managing data protection operations in the data system such as creating snapshots, backups, data replication and mirror operations, archive copying etc.

In addition, further data storage systems 400 are connected via a further communication networks 300, for example, for connection to data storage systems 400 on remote sites, for example, for data disaster recovery purposes.

The application hosts 100 can be operated as client computers operated by users, or the application hosts 100 can be connected to client computers 500 for providing application services to the client computers 500, for example for enabling data access to a centralized database operated on the application host 100 or for providing cloud applications.

Figure 2:
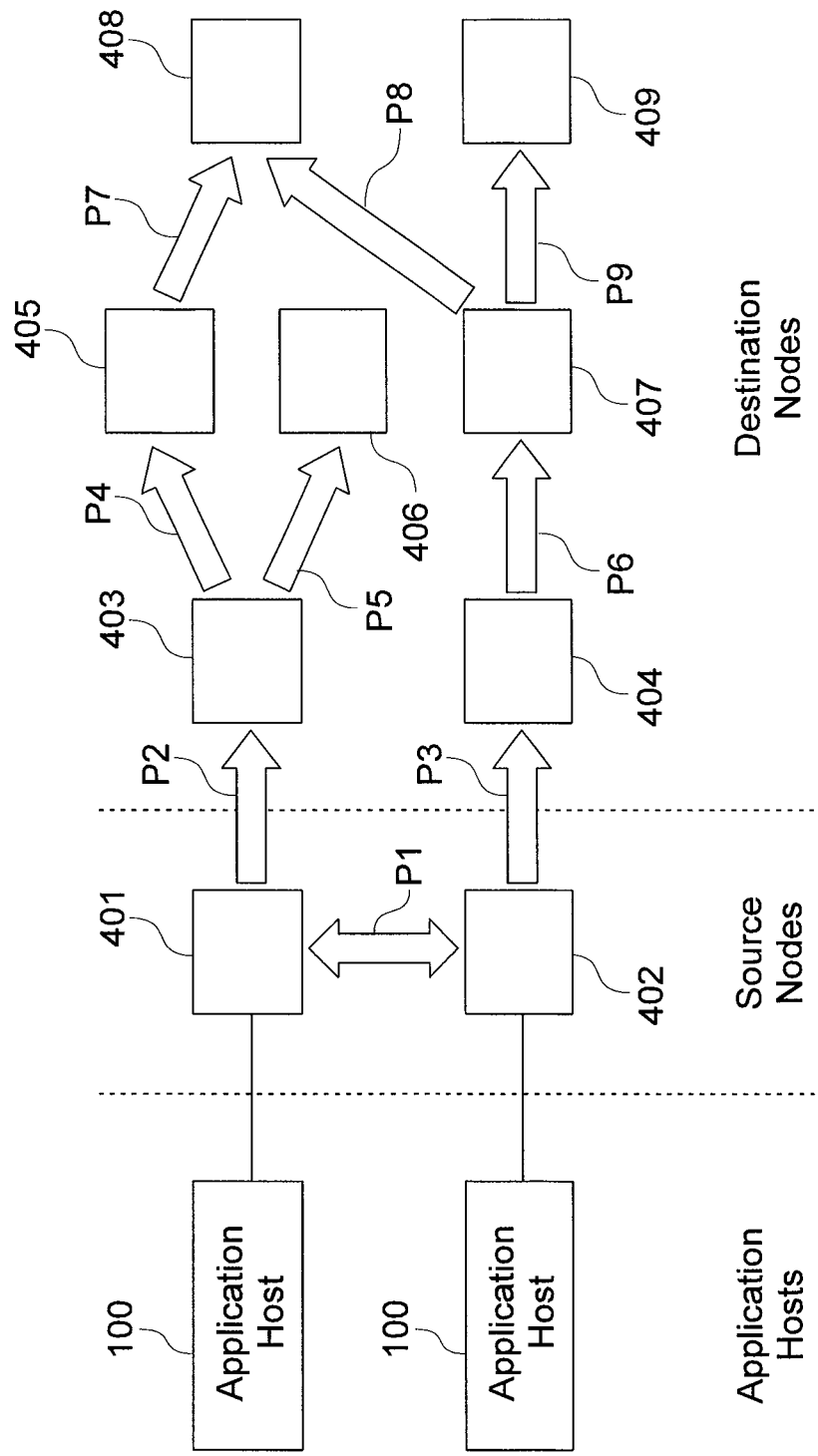
FIG. 2 exemplarily shows a schematic view of a data protection topology configuration including a plurality of nodes.

FIG. 2 exemplarily shows a data protection topology configuration including a plurality of nodes 401 to 409. Here, the term "node" refers to a logical or physical unit for storing data, and an individual node may be configured by one or more machines such as a workstation, a storage device, a storage server, a file system server connected to a storage system or a virtual machines. Also, multiple nodes may be configured on one physical device such as a workstation, a storage device, a storage server, a file system server connected to a storage system.

Exemplarily, each of the source nodes 401 and 402 is connected to an application host and is configured to store data associated with one or more applications running on the application hosts 100. Multiple data protection policies are defined in the data protection topology configuration of FIG. 2 and the plural nodes 401 to 409. The destination nodes 403 and 404 are configured to receive data directly or indirectly from the source nodes 401 and 402 for data protection purposes.

In general, a source node may represent a machine (e.g. server, workstation or virtual machine) which stores data to be managed. The source node may be configured to monitor one or more file systems of the host and be configured to perform and initiate data protection operations in accordance with user-defined data protection policies. Source nodes may be configured to transfer locally stored data, or implement data tracking, blocking or auditing functions. A destination node may represent a machine (e.g. server, workstation or virtual machine) which is configured to receive data such as a repository or general-purpose system designated as a recipient of data in a replication configuration. In addition, one of the nodes may be configured to represent a master node, which is configured to control the operations of other nodes in the system.

In general, a data protection policy is a configurable objective that is mapped to nodes or groups of nodes and defines at least a source node and a destination node. That is, on an abstract level, a data protection policy defines at least the data to be protected as managed by the source node, and the source of a data protection operation performed on the managed data.

Additionally, a data protection policy may further define a data movement operation according to a data path between the defined source and destination nodes. The data movement operation may define the type and/or direction of data protection operations to be performed between the source and destination nodes, e.g. mirror operation, replication operation, backup operation (e.g. batch backup and/or live backup), snapshot operation, archiving operation, versioning operation, and whether the data movement shall occur in batches (e.g. batch backup) or continuously (e.g. continuous data protection or as live backup), or whether the data is moved synchronously, asynchronously or asynchronously with temporally storing the data into log files.

Further, for each of the data protection operations or for groups of multiple parallel or chained data protection operations, the data protection policy may comprise further policy information such as protection objectives including data retention time (e.g. time for which the data stored by the data protection operation shall be retained at the destination node receiving the data), the frequency, periodicity or time windows at which data protection operations shall occur (e.g. a recovery point objective or the like). Also, additional objectives can define which data needs to be protected (e.g. based on file type, relation to an application, based on user groups or individual user identities etc.) and other time constraints (e.g. time windows that are excluded in which no data protection operations shall occur etc.).

As exemplarily shown in FIG. 2, the data protection topology configuration defines one bi-directional data mirror operation between the source nodes 401 and 402 by the bi-directional data movement operation P1, according to which data changes on one or the source nodes 401 and 402 is automatically reflected also on the other source node (e.g. bi-directional one-to-one data movement policy).

However, other than the mirror operation according to data movement operation P1, data movement operations for data protection purposes are typically one-directional from the source to the destination, but may be configured as one-to-one topologies (e.g. data movement operation P2 between nodes 401 and 403, data movement operation P3 between nodes 402 and 404, data movement operation P6 between nodes 404 and 407, and data movement operation P7 between nodes 405 and 408), as one-to-many topologies (e.g. data movement operations P4 and P5 from node 403 to nodes 405 and 406 and data movement operations P8 and P9 from node 407 to nodes 408 and 409, wherein each of the data movement operations P4 and P5 may have different defined data protection policies), and/or as many-to-one topologies (e.g. data movement operations P7 and P8 from nodes 407 and 405 to the node 408).

Further exemplarily, one or more of the downstream nodes, such as e.g. the node 409, could additionally be connected to another application host 100 (e.g. for testing purposes or the like).

In total, while individual policies can be defined between different nodes in the topology of FIG. 2, it becomes clear that the combination of all nodes and data movement operations defined may result in a very complex overall data protection policy involving potentially one or multiple physical devices and/or one or multiple virtual devices, potentially having different device-specific requirements.

In FIG. 2, exemplarily, multiple chains of nodes are provided. For example, node 401 has node 403 as downstream node. In turn, node 403 has node 401 as its upstream node and nodes 405 and 406 as downstream nodes. Node 405 has node 408 as downstream node, etc. Accordingly, in the topology of FIG. 2, there are multiple chains of nodes, such as the chained sequence of nodes 401→403→405→408, nodes 401→403→406, nodes 402→404→407→409 or nodes 402→404→407→408. In below embodiments, synchronization mechanisms are exemplarily described with respect to node chains comprising one source node and one destination node downstream thereof, or comprising one source node and two destination node so that the intermediate destination node has at least one upstream node (e.g. the source node) and one downstream node (e.g. the second destination node). However, it is to be noted that all of the below embodiments can be extended by the same principles to chains of four or more nodes, including branching chains in which one node has multiple downstream nodes (such as e.g. in FIG. 2) etc.

In preferred embodiments, a graphical user interface is provided in which a user may define a complex data protection policy topology based on a drag-and-drop principle, e.g. as disclosed in WO 2013/148769 A2, which is herewith incorporated by reference herein in its entirety.

For example, a user (e.g. an administrator being responsible of data protection in a data system including multiple nodes) may be enabled to select among a list of potential source nodes and a list of potential destination nodes, and be enabled include at least one source node and at least one destination node by means of a drag-and-drop operation into a configuration portion of the graphical user interface. In addition, the user may be provided with a list of available data movement operations between nodes (see above for examples), and be enabled to select a respective data movement operation by means of drag-and-drop to connect two respective nodes in the configuration portion of the graphical user interface. In addition, the graphical user interface may enable the user so set further policies for each of the data movement operation such as e.g. frequency or recovery point objective or the like and retention time or the like.

Figure 3A:
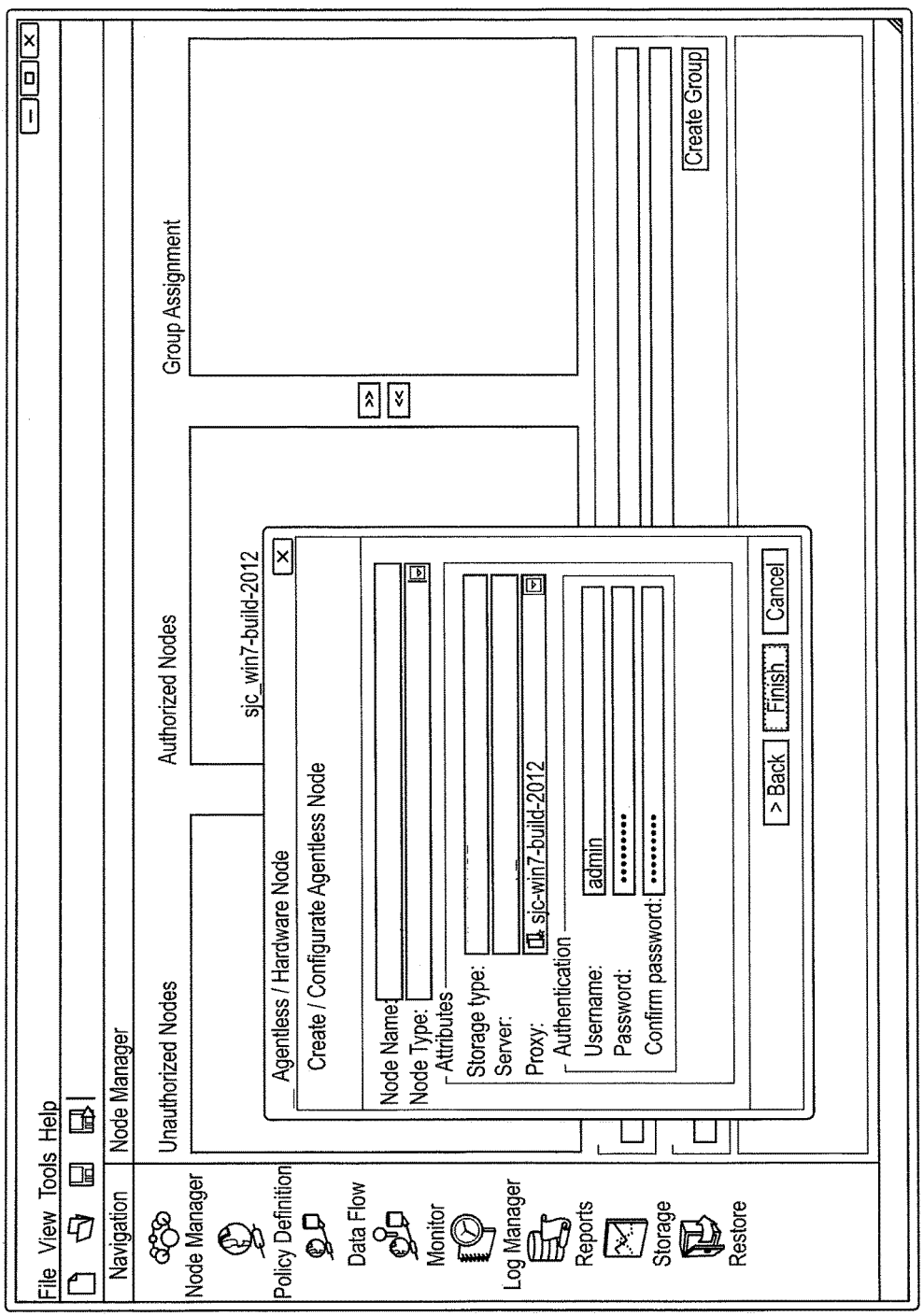
FIGS. 3A to 3D exemplarily show different screen image of an exemplary graphical user interface which can be provided so that a user may define a complex data protection policy topology based on a drag-and-drop principle.
Figure 3B:
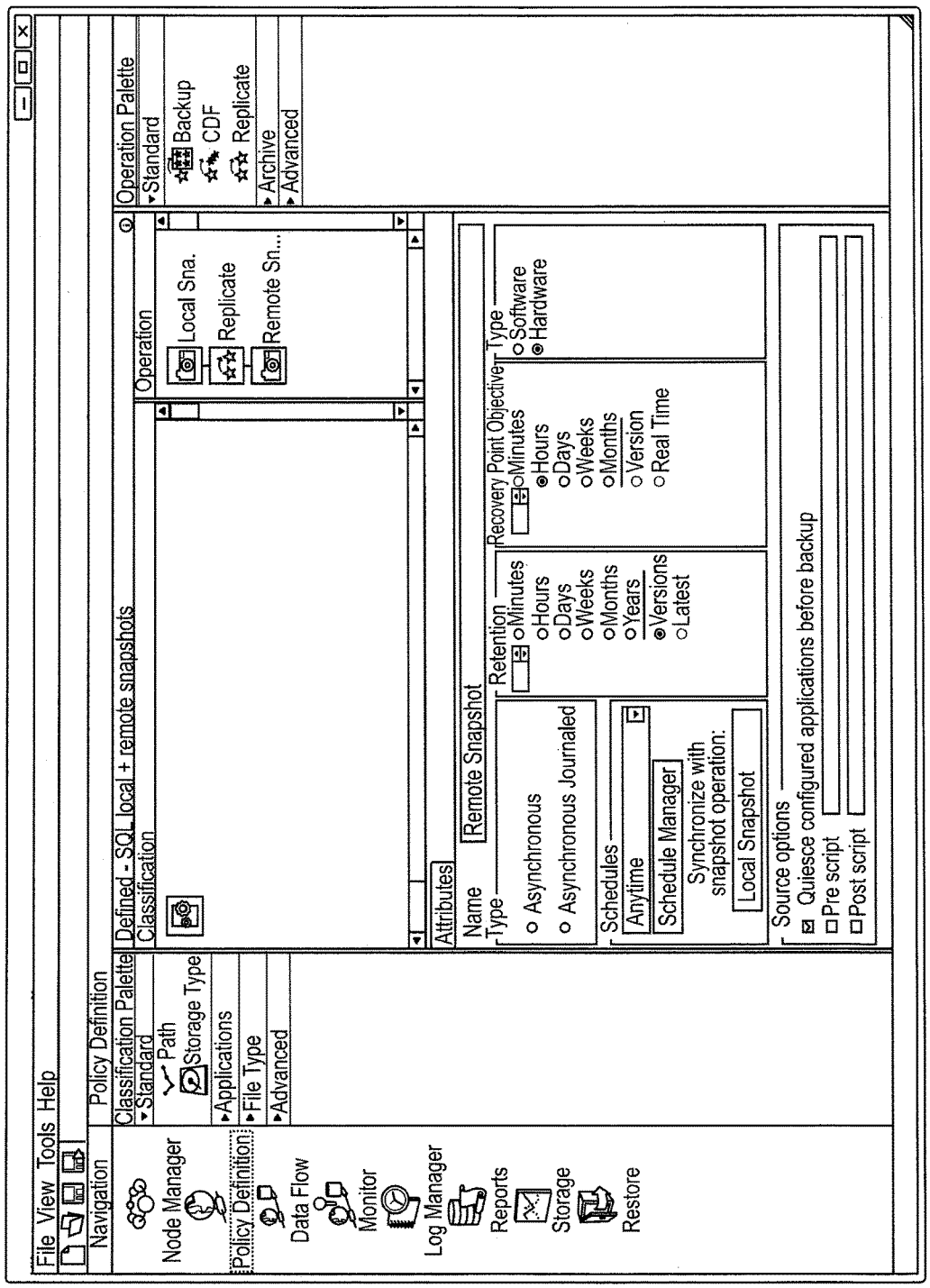
Figure 3C:
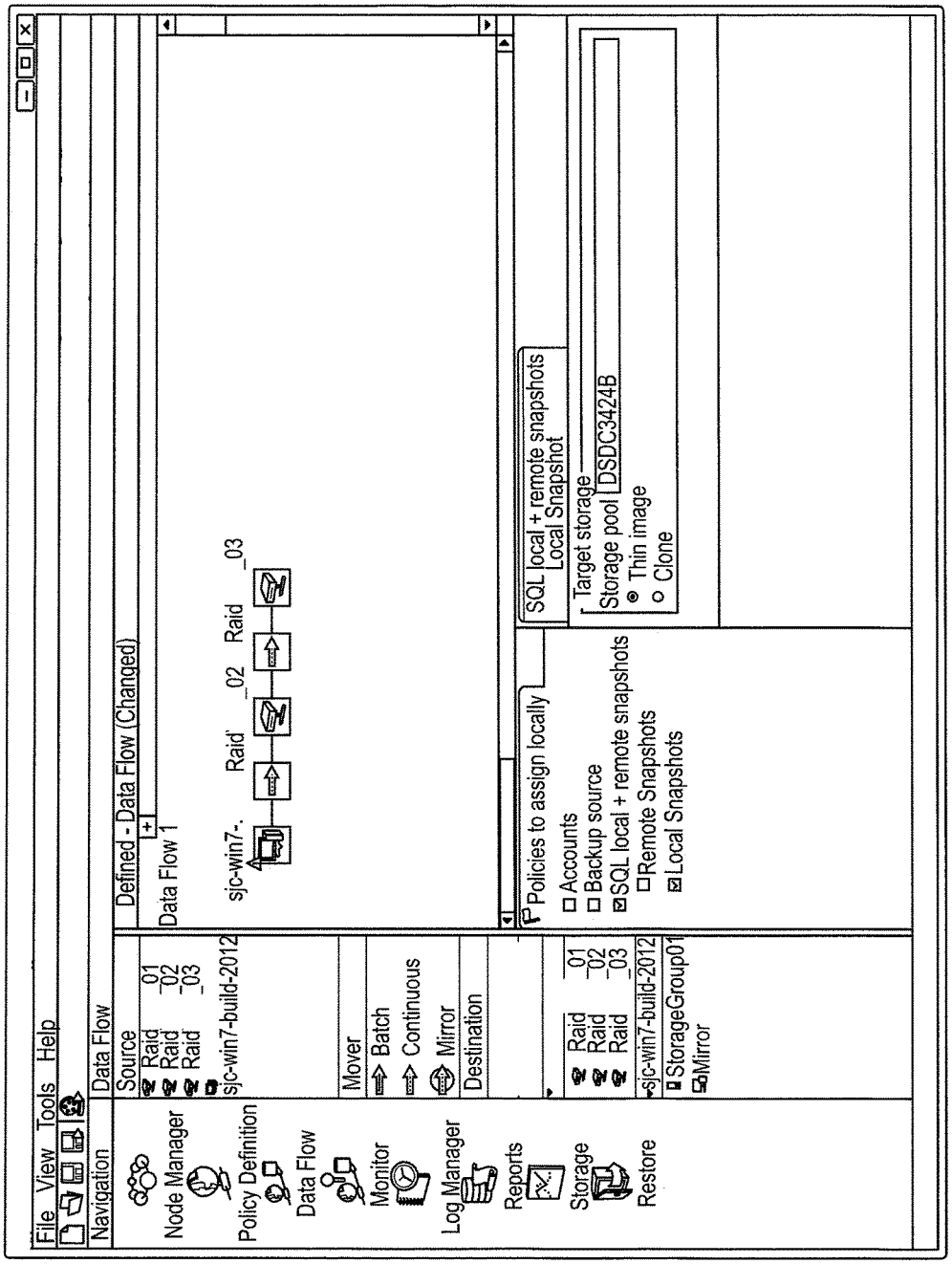
Figure 3D:
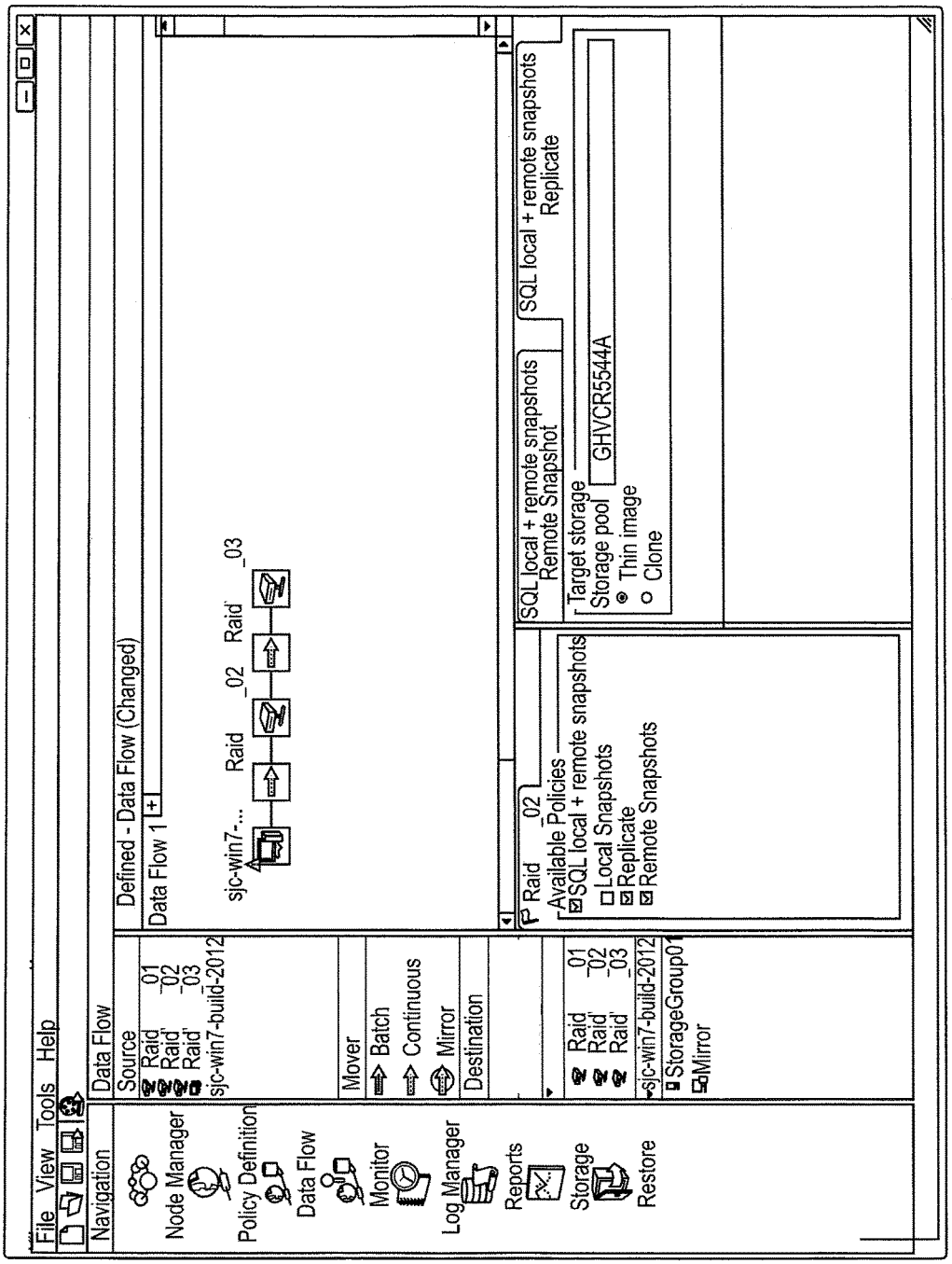

FIGS. 3A to 3D exemplarily show different screen image of an exemplary graphical user interface which is provided so that a user may define a complex data protection policy topology based on a drag-and-drop principle. Specifically, FIG. 3A exemplarily illustrates a screen image of the exemplary graphical user interface for configuring hardware such as storage devices. FIG. 3B exemplarily illustrates a screen image of the exemplary graphical user interface for defining policies for data protection operations. FIG. 3C exemplarily illustrates a screen image of the exemplary graphical user interface for assigning policies for data protection operations to a source node. FIG. 3D exemplarily illustrates a screen image of the exemplary graphical user interface for assigning policies for data protection operations to a destination node, such as e.g. to assign storage to clones and snapshots.

Based on a defined data protection policy topology, a compiler may be configured to compile a set of rules according to the defined data protection policy topology and distribute the compiled rules as rule information to the respective nodes, such that each node has the respective rule information (e.g. in the form of one or more rule files) according to its role in the defined data protection policy topology.

FIG. 4A exemplarily shows a hardware topology according to an exemplarily defined data protection policy topology, in which a source node 410 (only exemplarily a virtual node, could be a physical node as well) is connected to the application host 100, wherein the source node 410 receives data (in particular application-related data) from the application host 100 and is configured to perform, as a first data protection operation, snapshots according to the received data on the connected storage device 501 and, as a second data protection operation, live backup or continuous data protection to the destination node 411, wherein the destination node 411 is configured to perform, as a third data protection operation, snapshots according to the received data on the connected storage device 502, and, as a fourth data protection operation, batch backup to the destination node 412, wherein the destination node 412 is configured to perform, as a sixth data protection operation, snapshots according to the received data on the connected storage device 503.

FIG. 4B exemplarily shows a software unit topology according to the exemplarily defined data protection policy topology of FIG. 4A. According to embodiments of the invention, it is desired to synchronize data protection operations, such as e.g. the snapshots, performed at the nodes 410 to 412 with each other. For this purpose, as exemplarily shown in FIG. 4B, each of the nodes 410 to 412 functionally and/or physically includes a sequence management control unit. Accordingly, the source node 410 includes the first sequence management control unit 1000a, and the respective destination nodes 411 and 412 include sequence management control units 1000b and 1000c, respectively, wherein the sequence management control units 1000a to 1000c are communicably connected in sequence (e.g. according to a daisy chain) for synchronizing data protection operations according to the defined policy and in accordance with requirements of the application.

In addition, each of the each of the nodes 410 to 412 functionally and/or physically includes a hardware interface for communication with respective storage devices such as the storage devices 501 to 503 of FIG. 4A. Exemplarily, since source node 410 additionally communicates with the application or plural applications running on the application host 100, node 410 exemplarily includes also an application interface 2000 for communicating with the application(s).

FIG. 4C exemplarily shows a process of setting up a data system in accordance with exemplary embodiments.

In a step S41, a node topology configuration is defined (e.g. by defining the involved nodes, e.g. by selecting one or more source nodes and by selecting one or more destination nodes, e.g. as explained above). In a step S42, a data path configuration is defined (e.g. by selecting at least one data path between two mutual nodes according to one-to-one, one-to-many and/or many-to-one configurations so as to define data flow and define the roles of upstream nodes and downstream nodes). As a result of steps S41 and S42, a topology configuration is defined according to which there exists at least one source node upstream from at least one destination node, and at least one data path being defined from the at least one source node to the at least one destination node.

In a step S43, one or more data protection operations on nodes and/or between nodes are defined, e.g. backup, mirror, replicate or others form one node to another node, or performing a snapshot on one node, or the like. In a step S44, for each of the data protection operations and/or for each of a group of data protection operations, a data protection operation policy may be defined, e.g. specifying frequency (e.g. recovery point objective) of the data protection operation and/or retention time of copied data. In addition, policies may include specifying the target data based on location information (e.g. volume, path, directory, etc.) device type, data type (e.g. based on file extensions), access group based (e.g. based on the groups of users for which the data is accessible) and based on relations to one or more applications, etc.

In a step S45, the policies as defined in steps S41 to S46 for the whole policy topology configuration is compiled to create rule information reflecting the defined policies.

In a step S46, rule information units are created based on the rule information, wherein each rule information unit (e.g. represented by a rule file or a group of rule files, or an entry or group of entries in a rule database) is comprising the rules for at least one of the nodes and each rule information unit is associated with at least one of the nodes. Basically, since not every node needs the rule information of the whole policy topology configuration but only the rules to be complied with itself, the rule information unit being associated with a specific node includes the whole rule information required by the specific node, thereby potentially omitting rule information for other nodes.

In a step S47, sequence information units of sequence information are selected from pre-defined sequence information data. Specifically, based on a type of data protection operation, or based on a combination of data protection operations, multiple pre-defined sequence information units (e.g. in the form of script data including one or more sequence scripts) are provided, each sequence information unit being preferably associated with at least one data protection operation, and/or each data protection operation from a group of plural data protection operations being associated with a respective sequence information unit.

In a step S48, the sequence information units and the rule information units of steps S46 and S47 are distributed among the nodes so that each node of the data system has respective rule information including at least one respective created rule information unit and each node of the data system has respective sequence information including at least one respective selected sequence information unit.

Figure 5:
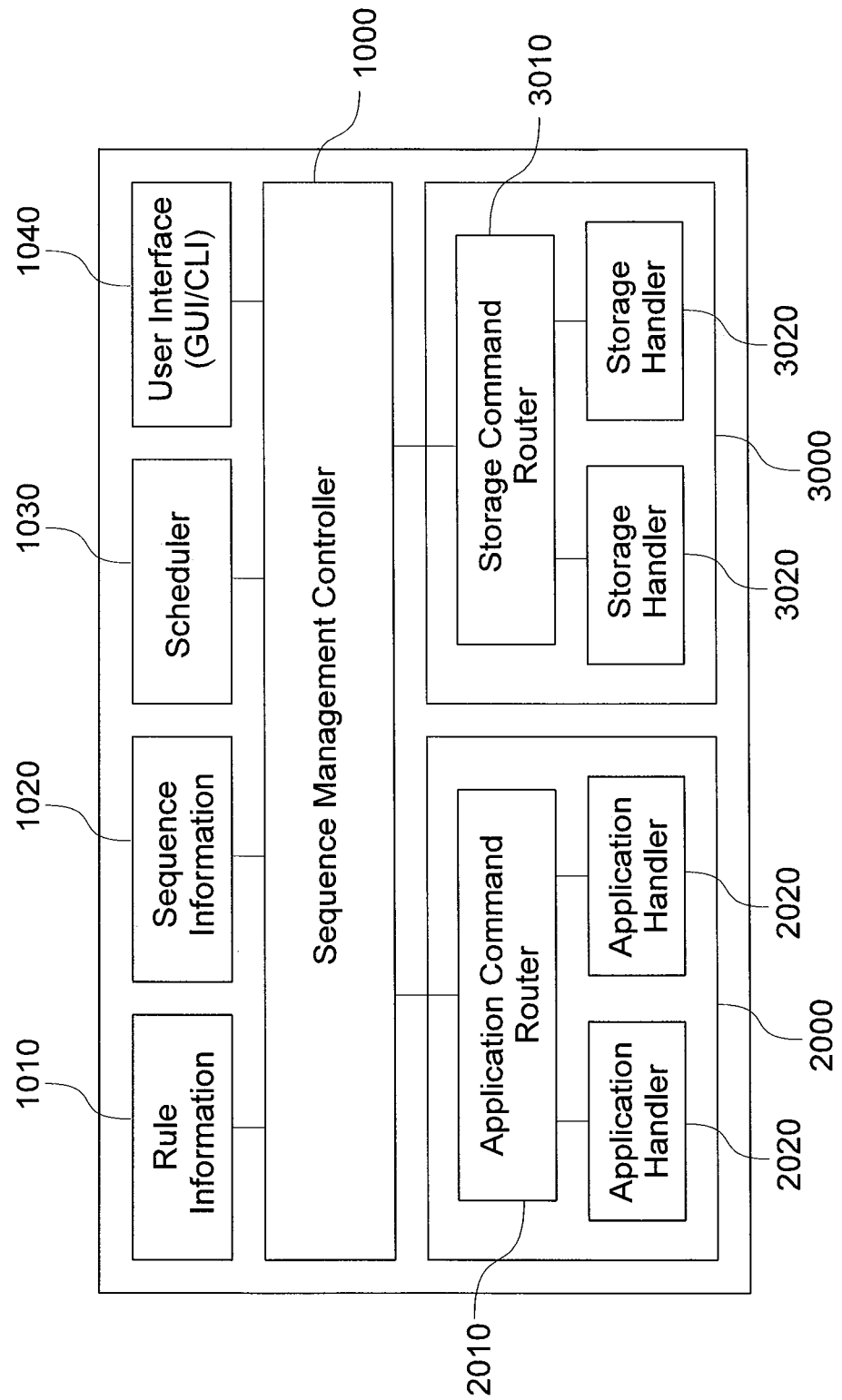
FIG. 5 exemplarily shows a schematic functional architecture of a node in accordance with exemplary embodiments.

FIG. 5 exemplarily shows a schematic functional architecture of a node 400. In general, node 400 may be configured as a source node so as to include the sequence management controller 1000, the application interface 2000 and the storage interface 3000 (also referred to as hardware interface). The application interface 2000 is configured to communicate with one or more applications running on a communicably connected application host. The storage interface 3000 is configured to communicably connect to one or more storage systems (including storage devices, storage server devices, storage system controllers or other types of logical, virtual or physical control units of storage).

Furthermore, the node 400 includes the sequence management controller 1000 connected to the application interface 2000 and the storage interface 3000, and being configured to communicably connect to one or more other nodes (including source nodes and destination nodes) depending on the defined data protection policy topology. As mentioned in connection with FIG. 4B, the destination nodes may be lacking the application interface 2000, i.e. a destination node may only comprise the sequence management controller 1000 and the storage interface 3000.

The sequence management controller 1000 is further connected in some embodiments, as exemplarily shown in FIG. 5, to a memory 1010 storing rule information including rules compiled on the basis of one or more data protection policies, a memory 1020 storing sequence information created and/or selected on the basis of data protection operations selected on the basis of one or more data protection policies, a scheduler unit 1030 for scheduling data protection operations selected on the basis of one or more data protection policies, and a user interface 1040 such as e.g. a CLI (command line interface) or GUI (graphical user interface) for enabling management, control and operation by a user. A destination node may include only the rule information 1010 and the sequence information 1020.

For example, the rule information 1020 may include one or more rule files, in which each rule file is preferably associated with a defined data protection operation according to a defined data protection policy, and the sequence information 1020 may include one or more sequence scripts, each sequence script being associated with a defined data protection operation.

The rule information may include rules in connection with a data protection operation performed by the respective node based on a defined data protection policy, in particular only those rules which need to be complied with by the respective node within the larger system of involved nodes.

On the other hand, the sequence information 1020 includes instructions of a sequence of operations to be executed by the respective node for performing the data protection operation and for synchronizing the sequence with one or more sequences of at least one of one or more upstream nodes (e.g. a node being connected upstream of the data system, i.e. a node from which data is received for a data protection operation) and one or more downstream nodes (e.g. a node being connected downstream of the data system, i.e. a node to which data is transferred for a data protection operation).

Specifically, the sequence management controller 1000 is configured to communicate to one or more applications via the application interface 2000, one or more storage systems (such as storage devices) via the storage interface 3000 and the other connected one or more sequence management controllers 1000 of other nodes, and is further configured to synchronize activities among its node 400, the one or more applications, the one or more storage systems and other connected one or more sequence management controllers 1000 of other nodes, using (potentially application-related or application-specific) sequencing information such as e.g. sequencing scripts related to one or more data protection operations.

Figure 6A:
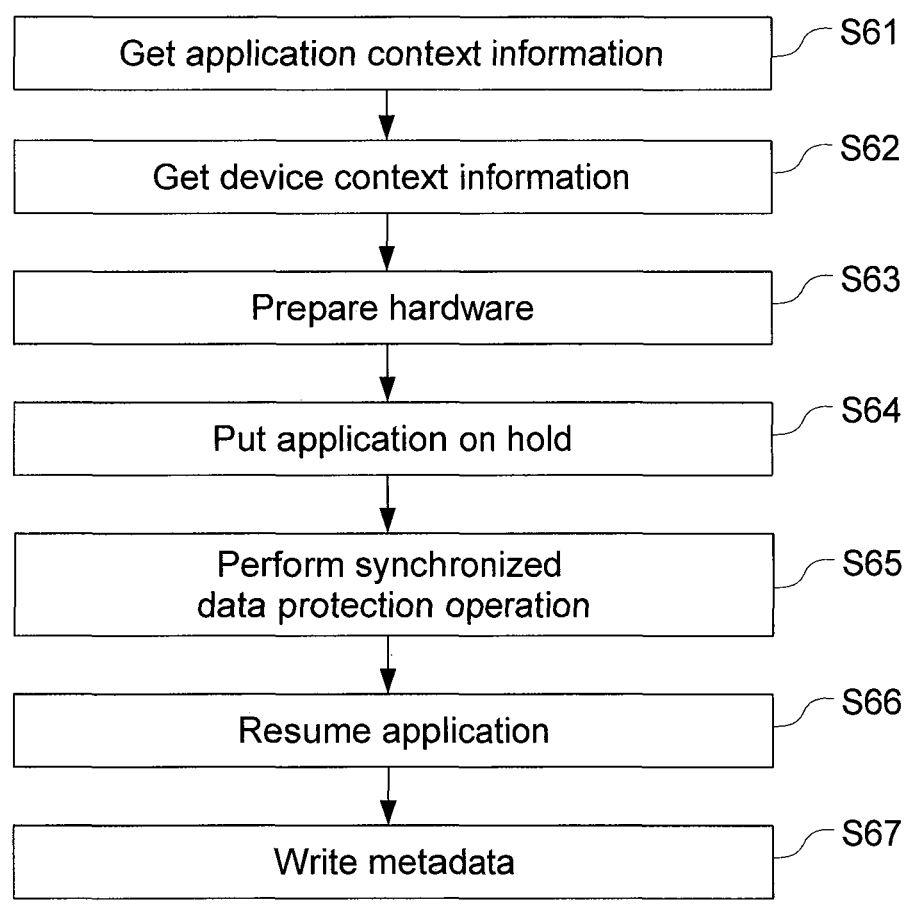
FIG. 6A exemplarily illustrates a flow chart of a process according to sequencing information on a source node in accordance with exemplary embodiments.

FIG. 6A exemplarily illustrates a flow chart of a process according to sequencing information on a source node.

In a step S61, the process includes to obtain application context information from the application(s) via the application interface based on associated rule information. Such application context information may at least indicate data portions which are related with the application based on rule information. For example, in case the rule information defines that all data related to the application shall be protected, the application context information indicates all data resources storing data involved with the application, including volumes (such as logical volumes and/or virtual volumes), files, folders or directories in file systems etc.; or in case the rule information defines that all data related to user data related to the application shall be protected, the application context information indicates all data resources storing user data related to the application, including volumes (such as logical volumes and/or virtual volumes), files, folders or directories in file systems etc.; or in case the rule information defines that all data related to management data related to the application shall be protected, the application context information indicates all data resources storing management data related to the application, including volumes (such as logical volumes and/or virtual volumes), files, folders or directories in file systems etc.

In a step S62, the process includes to obtain device context information from the storage systems/storage devices via the storage interface based on the associated rule information and/or based on the obtained application context information. For example, in case that the obtained application context information indicates all data resources (such as volumes, files, folders etc.) of data to be protected, the device context information includes mapping information which maps the data resources to physical data storage portions (such as physical storage devices, data block addresses, and also mapping to other devices such as shares or exports).

In a step S63, the storage hardware is prepared for performing the respective data protection operation according to the type of data protection operation in accordance with rule information and/or obtained device context information.

In a step S64, the sequence management controller 1000 instructs to put the application into a hold (e.g. according to a backup mode by an backup mode instruction, according to a snapshot consistency mode by a snapshot mode instruction, or according to a freeze mode by a freeze application instruction). In principle, it may be possible that taking a snapshot of application related data without putting the application into an appropriate snapshot mode may lead to a situation in which an application inconsistent snapshot is created, which could lead to a failure, if the application would resume based on the snapshot. Therefore, it is preferred in some embodiments of performing data protection operations on application related data, to put the application on a hold, prior to performing the data protection operation.

In a step S65, after putting the application on a hold in step S64, the process continues with performing a synchronized data protection operation. That is, in this step, the data protection operation (e.g. a snapshot) is performed at the respective node, but also synchronized data protection operations on other nodes (e.g. on downstream nodes) may be initiated (in more detail described below).

When the data protection operation is executed (and potentially when data protection operation confirmation notifications are received from one or more downstream nodes), the process continues with a step S66 of resuming the application.

Optionally, in some embodiments, an additional step S67 of writing metadata relating to the performed data protection operation may be performed. Such metadata may include a time and type of performed data protection information, and may additionally indicate the related data. For example, in data protection operations which only relate to modified data (e.g. a batch backup of modified data since a previous batch backup, a snapshot including modified data since the previous snapshot, etc., versioning of modified files), index data may be generated which includes an index of the modified data.

Figure 6B:
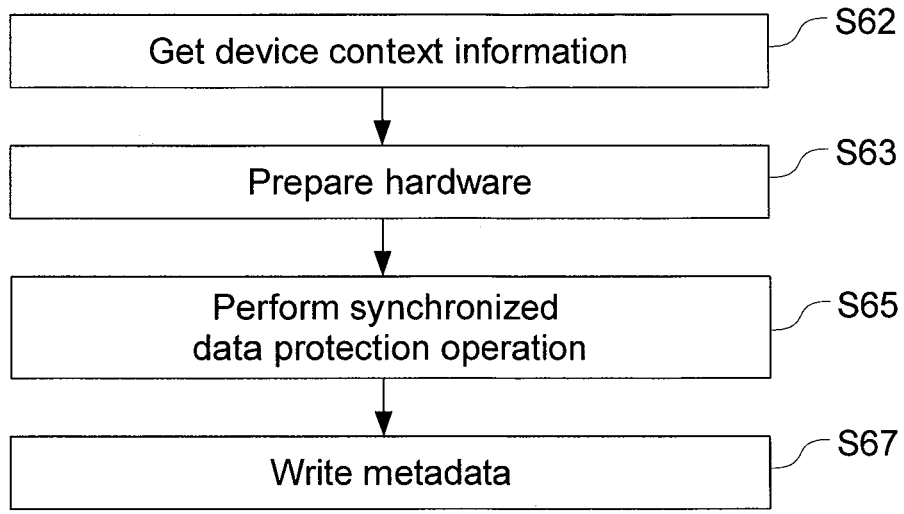
FIG. 6B exemplarily illustrates a flow chart of a process according to sequencing information on a destination node in accordance with exemplary embodiments.

FIG. 6B exemplarily illustrates a flow chart of a process according to sequencing information on a destination node.

In a step S62, the process includes to obtain device context information from the storage systems/storage devices via the storage interface based on the associated rule information, and potentially based on further instructions or context information received from an upstream node.

In a step S63, the storage hardware is prepared for performing the respective data protection operation according to the type of data protection operation in accordance with rule information and/or obtained device context information.

In a step S65, preferably upon receiving a synchronization notification from an upstream node, the process continues with performing a synchronized data protection operation. That is, in this step, the data protection operation (e.g. a snapshot) is performed at the respective node, but the synchronization is based on a notification by the one or more upstream nodes, and also synchronized data protection operations on other nodes (e.g. on downstream nodes) may be initiated.

When the data protection operation is executed (and potentially when data protection operation confirmation notifications are received from one or more downstream nodes and/or a confirmation of the performed data protection operation is issued to the upstream node), the process continues with an optional additional step S67 of writing metadata relating to the performed data protection operation may be performed. Such metadata may include a time and type of performed data protection information, and may additionally indicate the related data. For example, in data protection operations which only relate to modified data (e.g. a batch backup of modified data since a previous batch backup, a snapshot including modified data since the previous snapshot, etc., versioning of modified files), index data may be generated which includes an index of the modified data.

As becomes apparent from FIGS. 6A and 6B, it becomes conveniently possible according to some embodiments to efficiently synchronize multiple data protection operations during a time in which the application is put on hold (e.g. into a snapshot mode or backup mode) on multiple nodes of even very complex topologies in that each of the nodes notifies the downstream node(s) to perform the synchronized data protection operation, performs the data protection operation itself, and waits for the confirmation notification of the downstream node(s) before notifying the upstream node(s), or before resuming the application when it is the source node without any further upstream nodes.

Figure 6C:
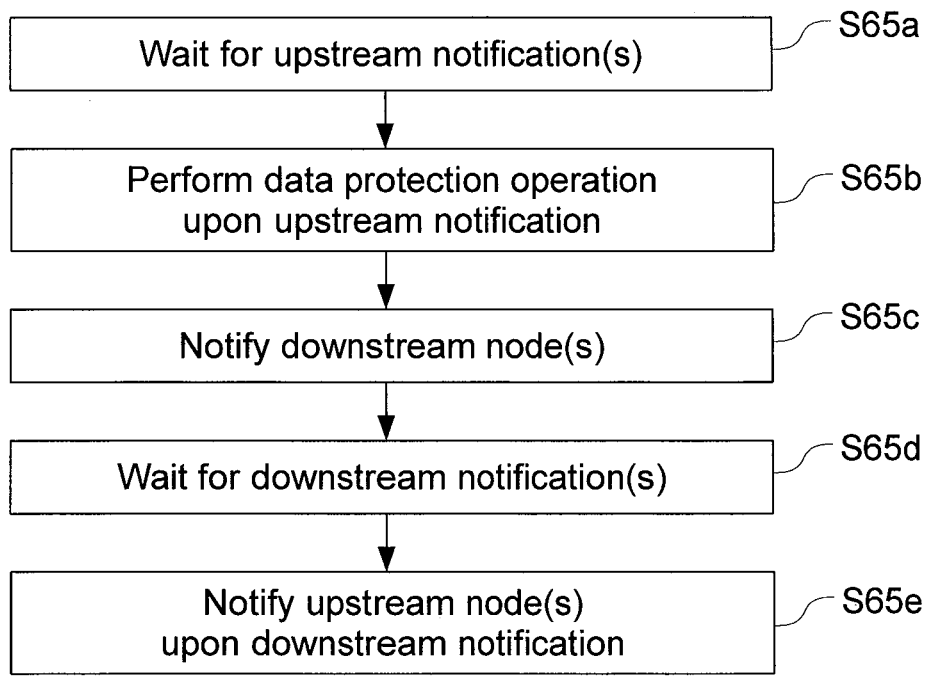
FIG. 6C exemplarily shows an exemplary flow chart of a process of performing a synchronized data protection operation in accordance with exemplary embodiments.

FIG. 6C exemplarily shows an exemplary partial process of performing a synchronized data protection operation (e.g. in step S65 of FIG. 6B).

In a step S65a, the node waits for an upstream notification, e.g. an instruction received from one or more upstream nodes. Of course, such step may be omitted in case of the source node, and instead the source node may perform the step S64 prior to step S65b. In this step S65b, the respective node performs the data protection operation according to its sequence information (it is to be noted that the different nodes may perform different types of data protection operations, or may respectively also perform multiple data protection operations such as multiple snapshots, or plural of snapshot, backup, archive copying, versioning, replication, mirror etc.).

In step S65c, the respective node notifies the one or more of its downstream nodes. Here, the downstream node(s) may be indicated in the rule information instead of in the sequence information. Specifically, in some embodiments, the sequence information may only include an instruction to notify all downstream nodes, and, whether there do exist any downstream nodes or how many downstream nodes exist, or how the existing downstream node(s) need to be notified may be specified in the rule information.

In the above, the order of steps S65b and S65c may be changed, and in other embodiments, it is possible to first notify the one or more downstream node(s) and then perform the data protection operation(s).

In step S65d, the node waits for the notification(s) of the downstream node(s) which confirm that the downstream node(s) (and their potential downstream node(s)) have performed their respective data protection operation(s), and upon receipt of the notification of the downstream node(s), the step S65e is performed to notify the upstream node(s) which confirms to the upstream node that the respective node and its downstream node(s) have performed their respective data protection operation(s). Instead of step S65e, at the source node, the source node may continue with the step S66 of resuming the application.

Figure 6D:
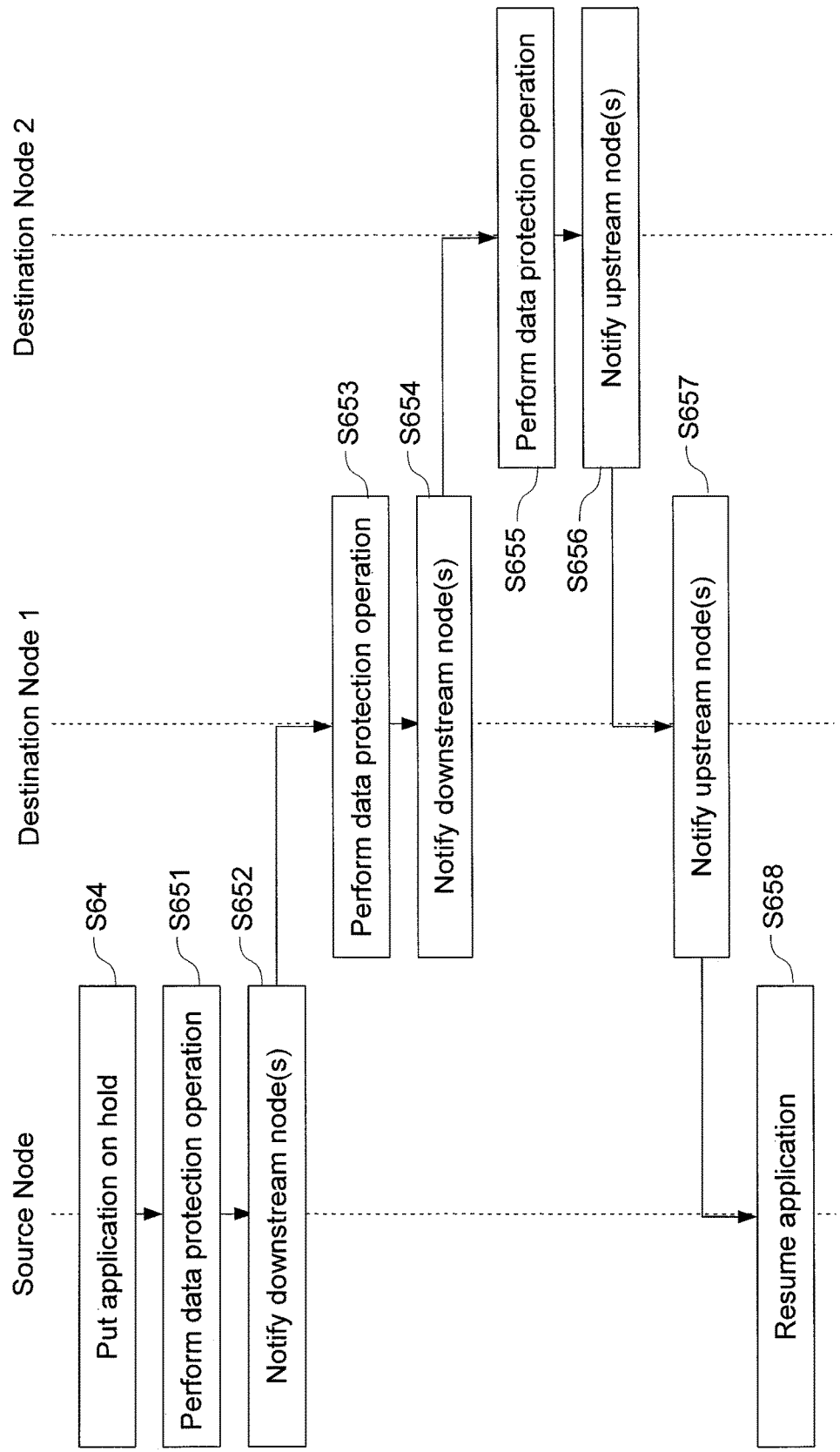
FIG. 6D exemplarily shows an exemplary process of performing a synchronized data protection operation in a system including three serially connected nodes in accordance with exemplary embodiments.

FIG. 6D exemplarily shows an exemplary process of performing a synchronized data protection operation in a system including three serially connected nodes, i.e. one source node and two successively connected destination nodes. First, the source node puts the application on hold via an instruction through the application interface (step S64), performs its data protection operation in a step S651 and notifies the destination node 1 as its direct downstream node in step S652, and then waits. On the other hand, the destination node 1 receives the notification from upstream (i.e. from the source node) and performs its data protection operation in a step S653 and notifies the destination node 2 as its direct downstream node in step S654, and then waits.

The destination node 2 receives the notification from upstream (i.e. from the destination node 1) and performs its data protection operation in a step S655 and, since its rule information exemplarily indicates that no further downstream nodes exist according to the topology (e.g. according to FIG. 4B), notifies the destination node 1 as its direct upstream node in step S656 in order to confirm the execution of the data protection operation at destination node 2.

The destination node 1 receives the notification from downstream (i.e. from the destination node 2) and, since its rule information exemplarily indicates that no further downstream nodes exist according to the topology (e.g. according to FIG. 4B), notifies the source node as its direct upstream node in step S657 in order to confirm the execution of the data protection operation at destination nodes 1 and 2.

The source node receives the notification from downstream (i.e. from the destination node 1) and, since its rule information exemplarily indicates that no further downstream nodes exist according to the topology (e.g. according to FIG. 4B), continues to resume the application in step S66.

Accordingly, each of the data protection operations of steps S651, S653 and S655 at different nodes are efficiently and reliably synchronized with respect to the state of the application after being put on hold in step S64, and all data protection operations of steps S651, S653 and S655 at different nodes are based on a consistent state of the application related data because the application has been put on hold according to a snapshot mode or backup mode prior to performing the data protection operations.

FIGS. 7A to 7E exemplarily illustrate an example of a process in a system comprising one source node (exemplarily referred to as "Initiator") and two daisy-chained downstream nodes (destination node 1 and destination node 2), such as e.g. shown in FIG. 4B.

Figure 7A:
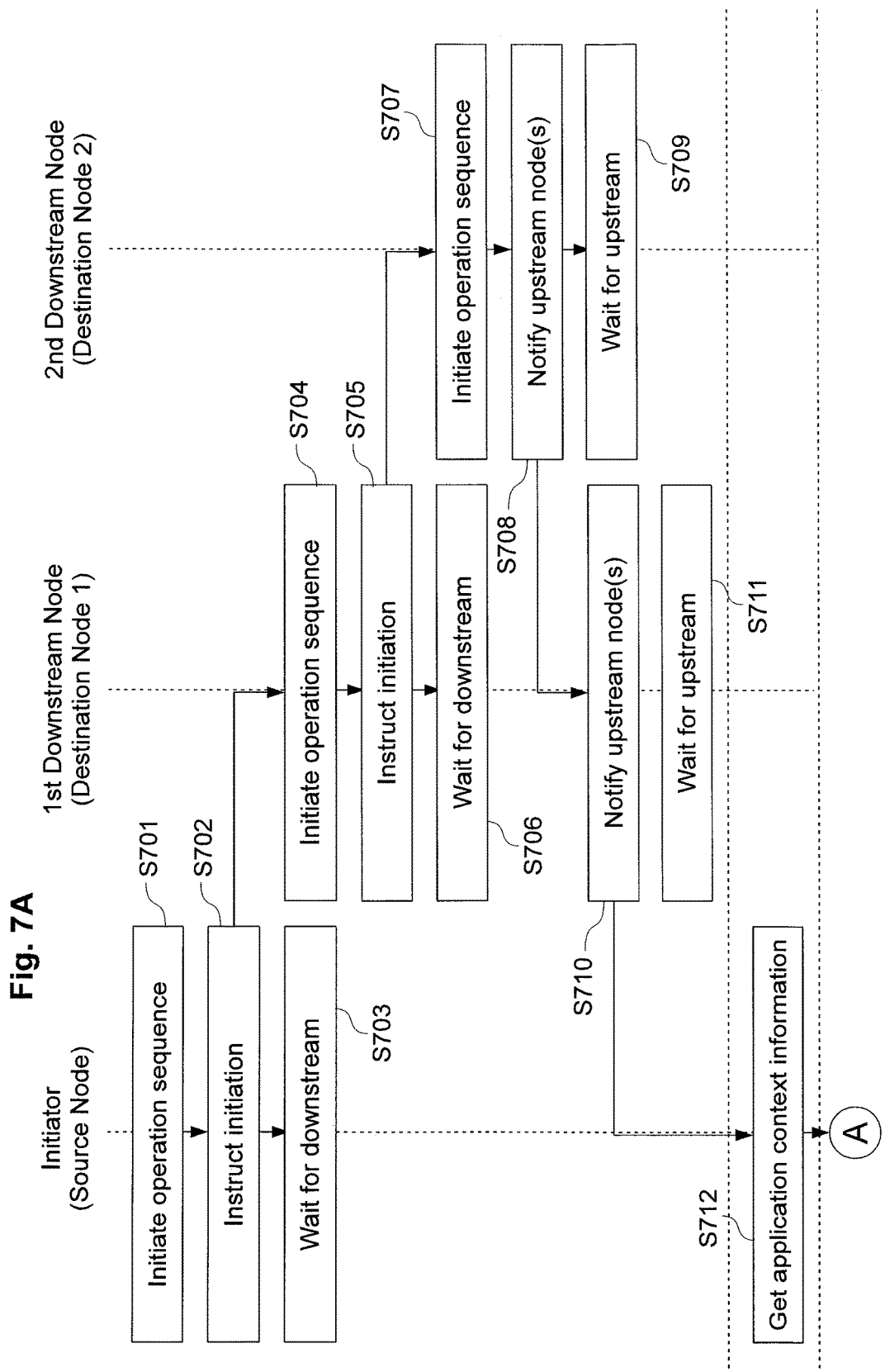
FIGS. 7A to 7E exemplarily illustrate an example of a process in a system comprising one source node and two daisy-chained downstream nodes in accordance with exemplary embodiments.
Figure 7B:
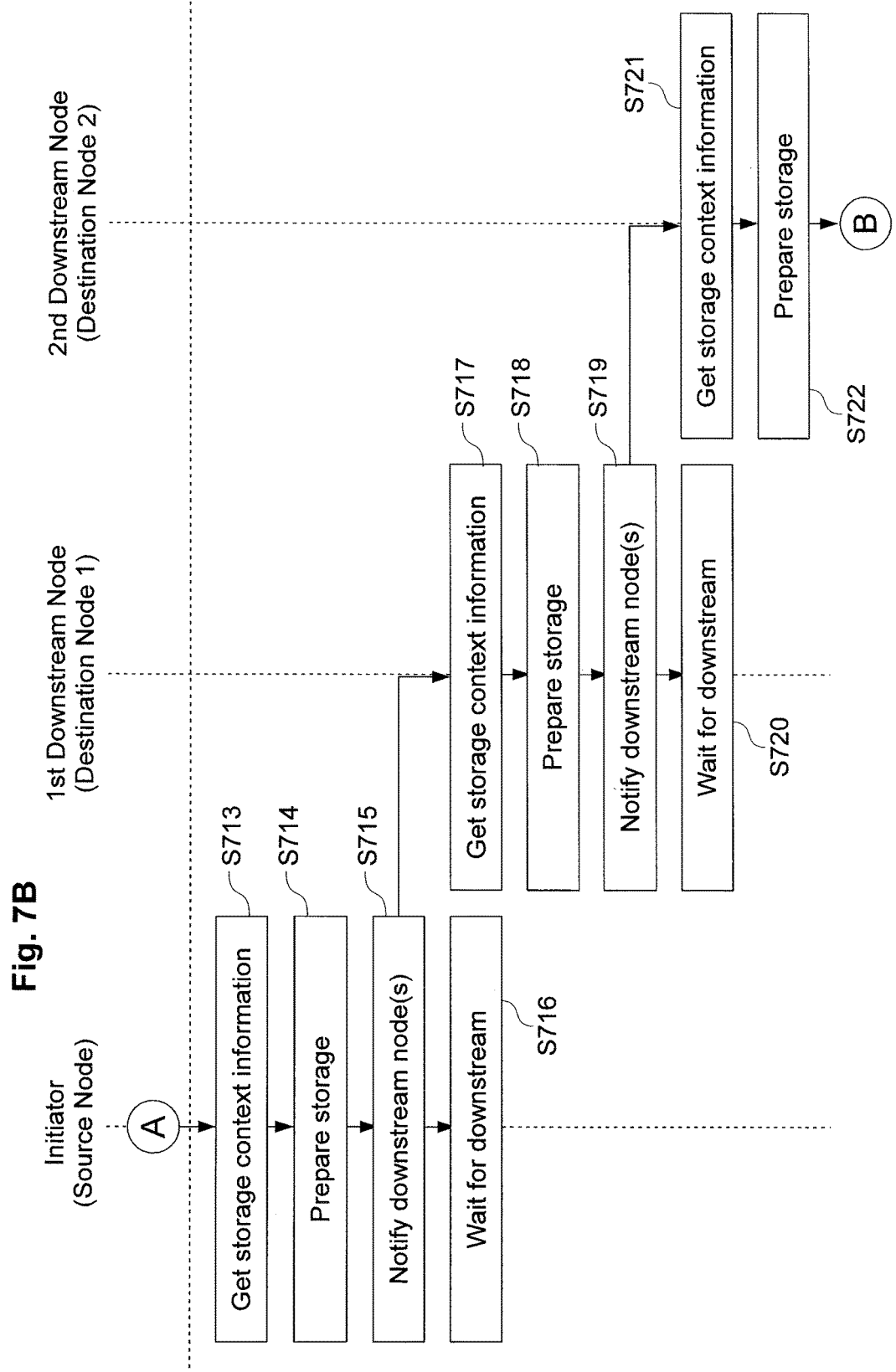
Figure 7C:
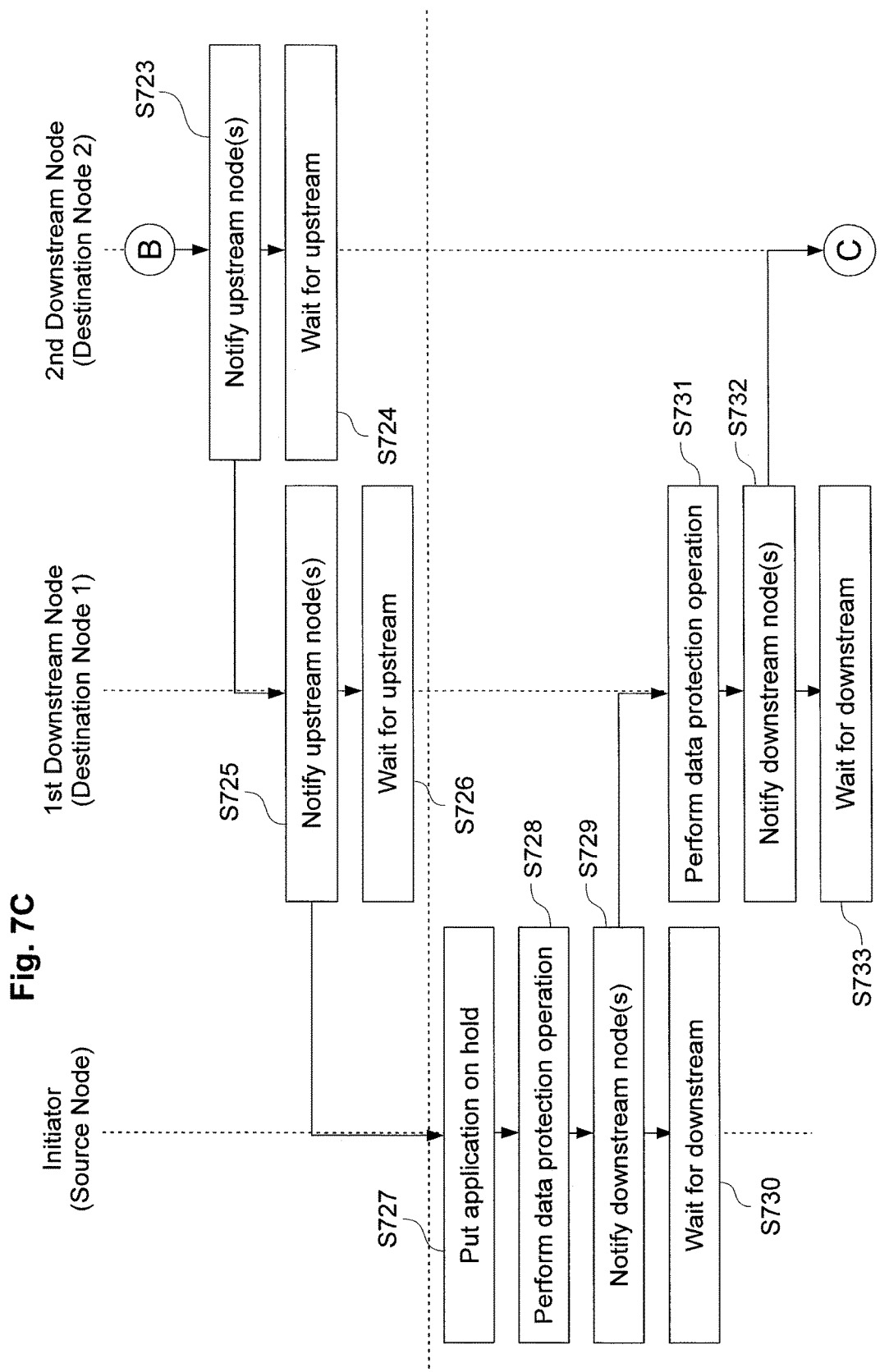
Figure 7D:
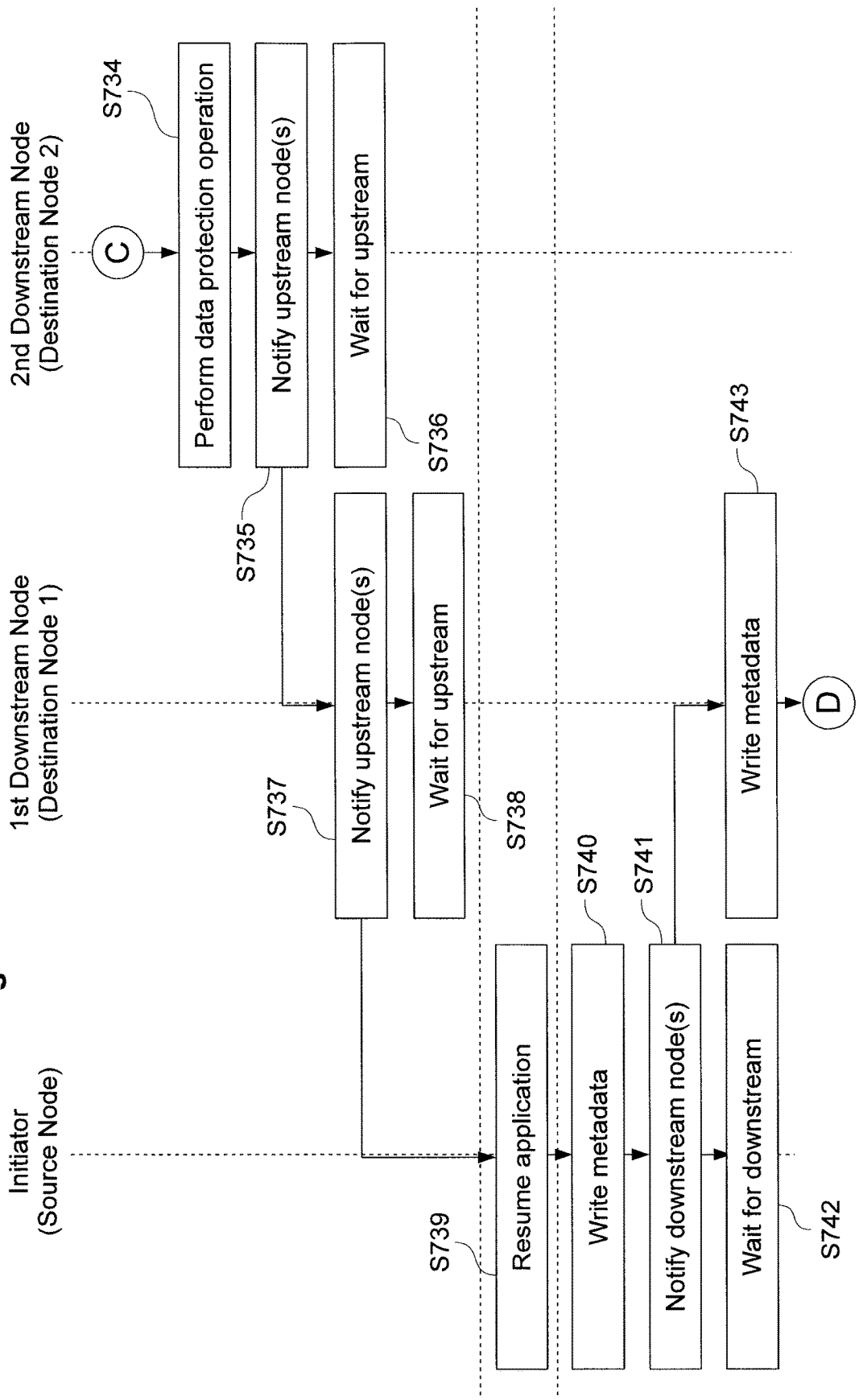
Figure 7E:
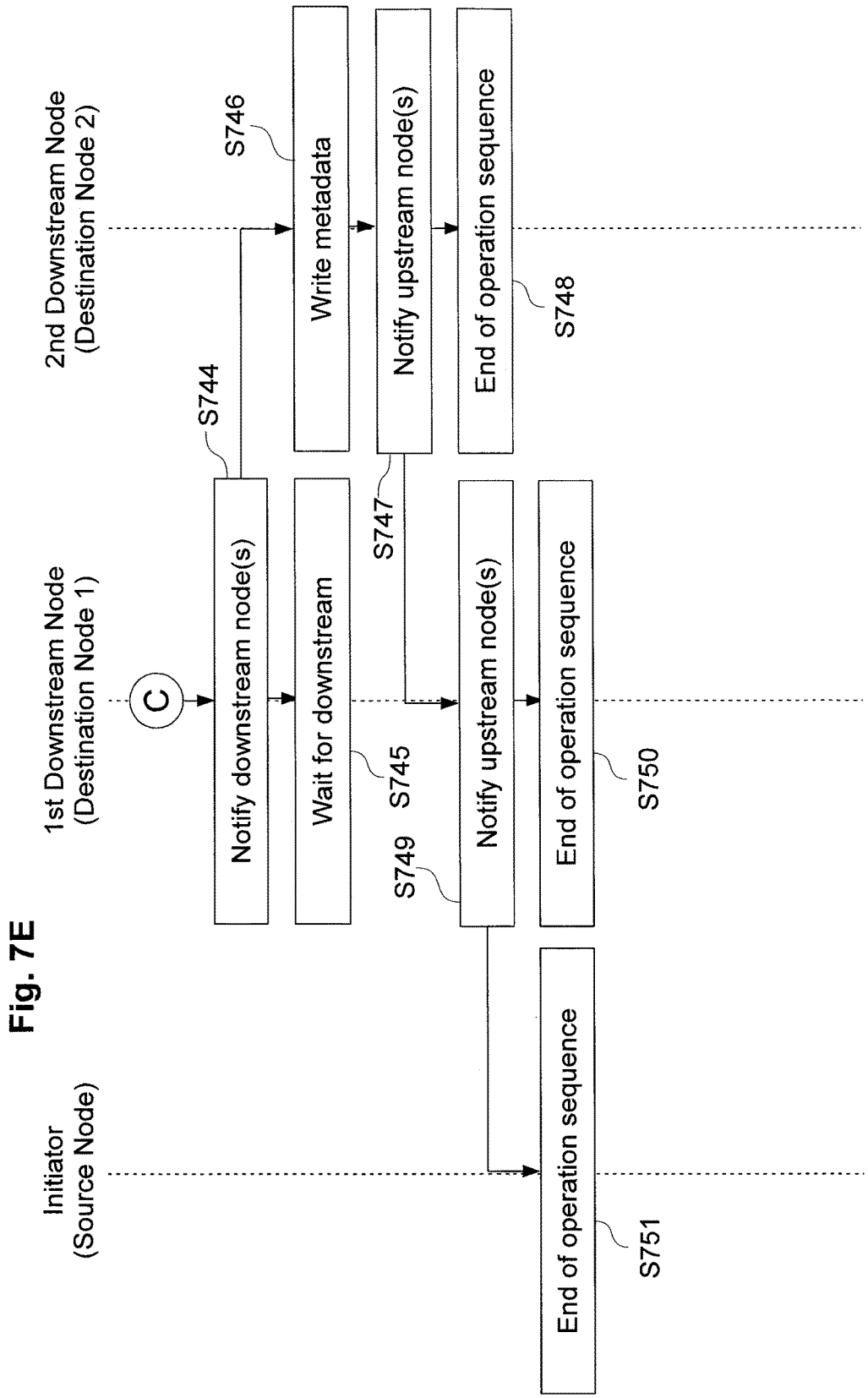

Each of the nodes has its respective sequence management controller 1000 using respective rule information 1010 data and respective sequence information 1020 data, see e.g. FIG. 5. In FIGS. 7A to 7C, the operations and communication between the three nodes is exemplarily illustrated, wherein each node follows its own respective sequence information 1020, e.g. a respective script according to script data and/or one or more script files, wherein the operations are efficiently synchronized by the structure of the sequence information 1020.

In a step S701, the sequence management controller 1000 of the source node (as "Initiator"), e.g. based on a request by the scheduler 1030 on the basis of rule information 1010 according to the defined data protection policies, acts to initiate the operation sequence for performing a synchronized data protection operation and sends an instruction to initiate the operation sequence in step S702 to the sequence management controller 1000 of the destination node 1 (as "1$^{st}$ downstream node"). Then, the sequence management controller 1000 of the source node waits for a notification from its downstream node, i.e. from the 1$^{st}$ downstream node, in step S703.

In response to receiving the instruction to initiate the operation sequence of step S702, the sequence management controller 1000 of the destination node 1 acts to initiate the respective operation sequence of its own sequence information for performing a synchronized data protection operation in step S704 and sends an instruction to initiate the operation sequence in step S705 to the sequence management controller 1000 of the destination node 2 (as "2$^{nd}$ downstream node"). Then, the sequence management controller 1000 of the destination node 1 ("1$^{st}$ downstream node") waits for a notification from its downstream node, i.e. from the 2$^{nd}$ downstream node, in step S706.

In response to receiving the instruction to initiate the operation sequence of step S705, the sequence management controller 1000 of the destination node 2 acts to initiate the respective operation sequence of its own sequence information for performing a synchronized data protection operation in step S707 and, since it is the most downstream node according to rule information of the example topology, sends a confirmation notification upstream to the destination node 1 in step S708. Then, the sequence management controller 1000 of the destination node 2 waits for another synchronization notification from upstream in step S709.

Upon receiving the confirmation notification of step S708 at the sequence management controller 1000 of the destination node 1, the sequence management controller 1000 of the destination node 1 sends a confirmation notification upstream to the source node in step S710. Then, the sequence management controller 1000 of the destination node 1 waits for another synchronization notification from upstream in step S711.

Upon receiving the confirmation notification of step S710 at the sequence management controller 1000 of the source node, the sequence management controller 1000 of the source node issues a request for application context information to the related application(s) via the application interface 2000 to get the related application context information in step S713.

Then, the sequence management controller 1000 of the source node issues a request for storage context information to the related storage system via the storage interface 3000 to get the related storage context information in step S713, and another request (e.g. a request to initialize the storage) to prepare the storage system for performing the data protection operation in step S714. Also, the sequence management controller 1000 of the source node issues a notification downstream to the destination node 1 in step S715 and then waits for a notification from its downstream node, i.e. from the destination node 1, in step S716.

Upon receiving the notification of step S715 at the sequence management controller 1000 of the destination node 1, the sequence management controller 1000 of the destination node 1 issues a request for storage context information to the related storage system via the storage interface 3000 to get the related storage context information in step S717, and another request (e.g. a request to initialize the storage) to prepare the storage system for performing the data protection operation in step S718. Also, the sequence management controller 1000 of the source node issues a notification downstream to the destination node 2 in step S719 and then waits for a notification from its downstream node, i.e. from the destination node 2, in step S702.

Upon receiving the notification of step S719 at the sequence management controller 1000 of the destination node 2, the sequence management controller 1000 of the destination node 2 issues a request for storage context information to the related storage system via the storage interface 3000 to get the related storage context information in step S721, and another request (e.g. a request to initialize the storage) to prepare the storage system for performing the data protection operation in step S722. Also, the sequence management controller 1000 of the destination node 2 issues a notification upstream to the destination node 1 in step S723 and then waits for another synchronization notification from its upstream node, i.e. from the destination node 1, in step S724.

Upon receiving the confirmation notification of step S723 at the sequence management controller 1000 of the destination node 1, the sequence management controller 1000 of the destination node 1 sends a confirmation notification upstream to the source node in step S725. Then, the sequence management controller 1000 of the destination node 1 waits for another synchronization notification from upstream in step S726.

Upon receiving the confirmation notification of step S725 at the sequence management controller 1000 of the source node, the sequence management controller 1000 of the source node puts the related application(s) on hold (e.g. into a snapshot mode, backup mode or freeze mode) in step S727 by issuing a corresponding request or instruction to the application(s) via the application interface 2000.

When the confirmation reply is received from the application(s), the sequence management controller 1000 of the source node continues so as to perform the data protection operation in step S728 by issuing the respective command(s), request(s) or instruction(s) to the storage system(s) via the storage interface 3000. Also, the sequence management controller 1000 of the source node issues a synchronization notification downstream to the destination node 1 in step S729 and then waits for a notification from its downstream node, i.e. from the destination node 1, in step S730.

Upon receiving the notification of step S729 at the sequence management controller 1000 of the destination node 1, the sequence management controller 1000 of the destination node 1 continues so as to perform the data protection operation in step S731 by issuing the respective command(s), request(s) or instruction(s) to the storage system(s) via the storage interface 3000.

Also, the sequence management controller 1000 of the destination node 1 issues a synchronization notification downstream to the destination node 2 in step S732 and then waits for a notification from its downstream node, i.e. from the destination node 2, in step S733.

Upon receiving the notification of step S732 at the sequence management controller 1000 of the destination node 2, the sequence management controller 1000 of the destination node 2 continues so as to perform the data protection operation in step S734 by issuing the respective command(s), request(s) or instruction(s) to the storage system(s) via the storage interface 3000.

The sequence management controller 1000 of the destination node 2 then issues a notification upstream to the destination node 1 in step S735 and then waits for a further synchronization notification from upstream, i.e. from the destination node 1, in step S736.

Upon receiving the confirmation notification of step S735 at the sequence management controller 1000 of the destination node 1, the sequence management controller 1000 of the destination node 1 sends a confirmation notification upstream to the source node in step S737. Then, the sequence management controller 1000 of the destination node 1 waits for another synchronization notification from upstream in step S738.

Upon receiving the confirmation notification of step S737 at the sequence management controller 1000 of the source node, the sequence management controller 1000 of the source node resumes the related application(s) (e.g. into a normal mode) by issuing a corresponding request or instruction to the application(s) via the application interface 2000 in step S739.

As a result, all three nodes efficiently have performed a respective data protection operation in a synchronized manner, while the related application(s) was/were in a same hold mode (e.g. backup mode or snapshot mode), and still the hold time period of the application(s) could be kept as short as possible, in that preparation of the storage and obtaining the relevant management information was performed by all involved nodes in a synchronized manner prior to putting the related application(s) to a hold.

When the confirmation reply is received from the application(s), the sequence management controller 1000 of the source node continues so as to instruct writing of metadata in step S740 by issuing the respective command(s), request(s) or instruction(s) to the storage system(s) via the storage interface 3000. Also, the sequence management controller 1000 of the source node issues a synchronization notification downstream to the destination node 1 in step S741 and then waits for a notification from its downstream node, i.e. from the destination node 1, in step S742.

Upon receiving the notification of step S741 at the sequence management controller 1000 of the destination node 1, the sequence management controller 1000 of the destination node 1 continues so as to instruct writing of metadata in step S753 by issuing the respective command(s), request(s) or instruction(s) to the storage system(s) via the storage interface 3000. Also, the sequence management controller 1000 of the destination node 1 issues a synchronization notification downstream to the destination node 2 in step S744 and then waits for a notification from its downstream node, i.e. from the destination node 2, in step S745.

Upon receiving the notification of step S744 at the sequence management controller 1000 of the destination node 2, the sequence management controller 1000 of the destination node 2 continues so as to perform to instruct writing of metadata in step S746 by issuing the respective command(s), request(s) or instruction(s) to the storage system(s) via the storage interface 3000. Also, the sequence management controller 1000 of the destination node 2 issues a notification upstream to the destination node 1 in step S747 and then ends the operation sequence in step S748.

Upon receiving the confirmation notification of step S747 at the sequence management controller 1000 of the destination node 1, the sequence management controller 1000 of the destination node 1 sends a confirmation notification upstream to the source node in step S749 and then ends the operation sequence in step S750.

Finally, upon receiving the confirmation notification of step S750 at the sequence management controller 1000 of the source node, the sequence management controller 1000 of the source node ends the operation sequence in step S751.

Figure 8B:
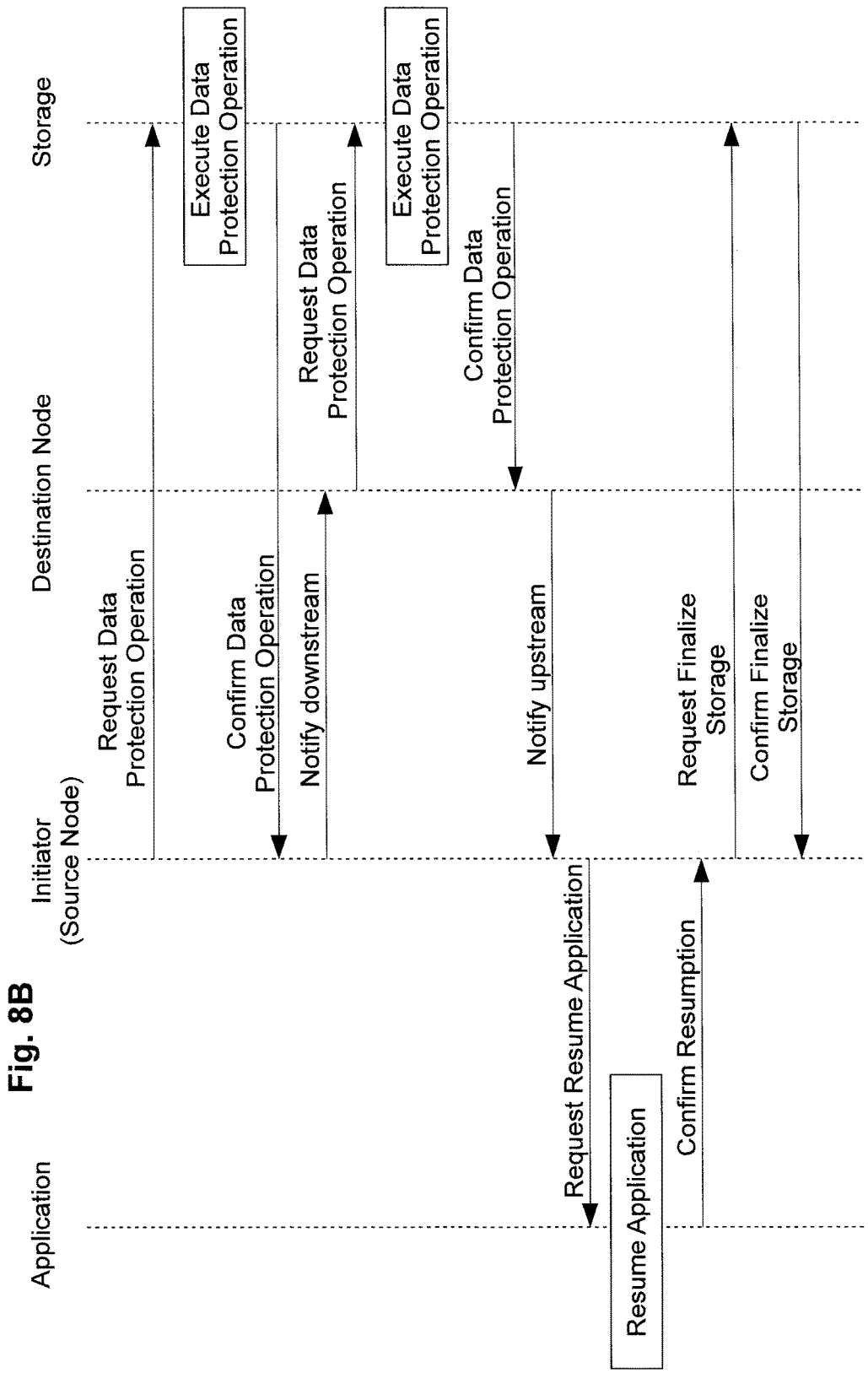
Figure 8C:
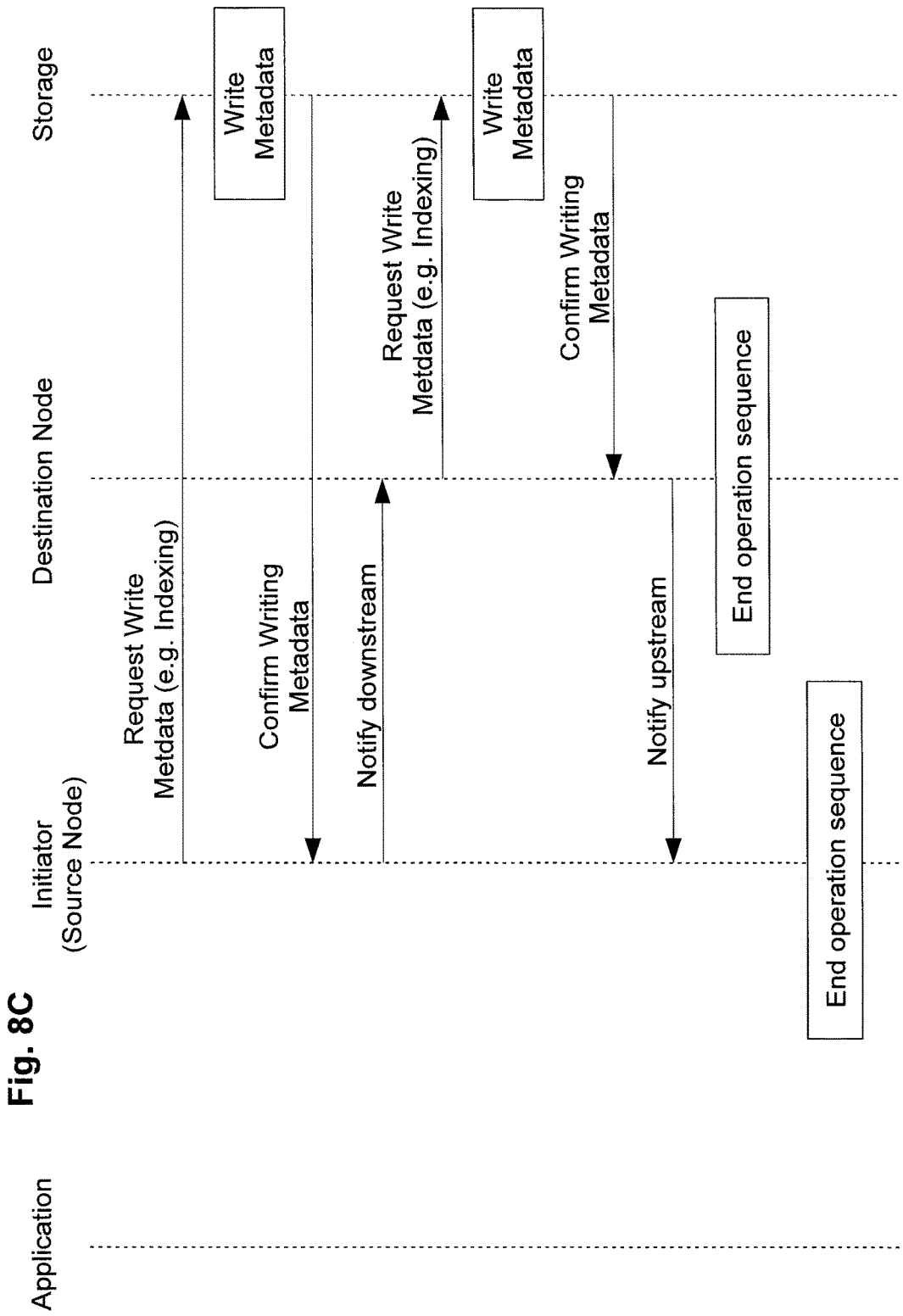

FIGS. 8A to 8C exemplarily illustrate an example of a process in a system comprising one source node (exemplarily referred to as "Initiator") and one downstream node (destination node 1).

Each of the nodes has its respective sequence management controller 1000 using respective rule information 1010 data and respective sequence information 1020 data, see e.g. FIG. 5. In FIGS. 8A to 8B, the operations and communication between the nodes, including the communication between the two nodes, the application(s) and the storage system(s), is exemplarily illustrated, wherein each node follows its own respective sequence information 1020, e.g. a respective script according to script data and/or one or more script files, wherein the operations are efficiently synchronized by the structure of the sequence information 1020.

Similar to step S701 above, the sequence management controller 1000 of the source node, as "Initiator", initiates the operation sequence and instructs initiation of the operation sequence also downstream to the downstream node. In response, the sequence management controller 1000 of the downstream node initiates the operation sequence and issues a confirmation notification for notifying initiation of the operation sequence upstream to the source node. Accordingly, similar to steps S701 to S710 above, the nodes of the system topology act to initiate their respective operation sequences in a synchronized manner.

Similar to step S712 above, the sequence management controller 1000 of the source node issues a request via the application interface 2000 to the related application(s) to obtain the relevant application context information, and the application(s) return the requested application context information. In particular, the application context information may indicate storage resources such as virtual volumes, logical volumes, file systems, folders or directories, files or other attributes which identify data portions to be the target of a data protection operation for the application-related application. On the other hand, in some embodiments, application context information does not indicate information on where the data of the storage resources are actually stored on the storage systems, e.g. physical addresses, block-addresses, device numbers or the like. In some embodiments, it may also possible that the required application context information is obtained fully or partially from the rule information.

Similar to step S713 above, the sequence management controller 1000 of the source node issues a request via the storage interface 3000 to the related storage system(s) to obtain the relevant storage context information, and the storage system(s) or a storage management server may return the requested storage context information. In particular, the storage context information may indicate information on where the data of the storage resources are actually stored on the storage system(s), e.g. physical addresses, block-addresses, device numbers or the like. In some embodiments, it may also possible that the required storage context information is obtained fully or partially from the rule information.

Then, similar to step S715 above, the sequence management controller 1000 of the source node issues a synchronization notification to the downstream node. Similar to step S717 above, the sequence management controller 1000 of the downstream node issues a request via the storage interface 3000 to the related storage system(s) to obtain the relevant storage context information, and the storage system(s) or a storage management server may return the requested storage context information. In some embodiments, it may also possible that the required storage context information is obtained fully or partially from the rule information.

To notify the source node, the sequence management controller 1000 of the downstream node issues a confirmation notification to the source node, and then the sequence management controller 1000 of the source node continues with issuing a request to the related application(s) to be put on hold (such as e.g. a freeze mode request, a backup mode request or a snapshot mode request etc.), similar to step S727 above.

Upon going into the held state (such as e.g. a freeze mode request, a backup mode request or a snapshot mode request etc.), the application(s) confirms via a confirmation reply through the application interface 2000.

Now that the application(s) is/are on hold, the synchronized data protection operations can be performed on all of the involved nodes, such as one or more snapshot operations, one or more backup operations, one or more replication operations, one or more archiving operations, one or more versioning operation or the like.

The sequence management controller 1000 of the source node issues a request (or multiple involved instructions, commands or requests) to the storage system(s) through the storage interface 3000 to request execution of a respective data protection operation, so that the storage system(s) execute the requested data protection operation and issues a confirmation reply back to the sequence management controller 1000 of the source node.

Then, similar to step S729 above, the sequence management controller 1000 of the source node issues a synchronization notification to the downstream node. Similar to step S731 above, the sequence management controller 1000 of the downstream node issues a request (or multiple involved instructions, commands or requests) to the storage system(s) through the storage interface 3000 to request execution of a respective data protection operation, so that the storage system(s) execute the requested data protection operation and issues a confirmation reply back to the sequence management controller 1000 of the downstream node.

To notify the source node, the sequence management controller 1000 of the downstream node issues a confirmation notification to the source node, and then the sequence management controller 1000 of the source node continues with issuing a request to the related application(s) to resume again, similar to step S739 above. The application(s) then resume and respond by issuing a confirmation reply via the application interface 2000 to the sequence management controller 1000 of the source node.

In some embodiments, the sequence management controller 1000 of the source node may then request the storage system(s) to go to a finalized state that allows to write metadata on the performed data protection operation (such as e.g. an index of changed or modified data, modified files or folders, retained file versions, etc.) thereafter, and upon receiving the confirmation reply from the storage system(s), the metadata can be written in a synchronized manner again.

The sequence management controller 1000 of the source node issues a request to the related storage system(s) to write associated metadata, and a confirmation reply from the related storage system(s) is received via the storage interface 3000 at the source node after the related storage system(s) have written the metadata.

Then, the sequence management controller 1000 of the source node notifies the downstream node, and the sequence management controller 1000 of the downstream node issues a request to the related storage system(s) to write associated metadata, and a confirmation reply from the related storage system(s) is received via the storage interface 3000 at the downstream node after the related storage system(s) have written the metadata. Then, the sequence management controller 1000 of the downstream node sends a confirmation notification to the source node, and the process ends.

In the above, synchronized operations may be achieved at the plural nodes of a defined policy topology, in that each node has the related rule information (such as one or more rule files, for example) and at least one related sequence information, e.g. in the form of script data or a script.

An example script as sequence information for an exemplary snapshot operation as the data protection information is given below:

```
function doSnapshot( )
{
  var upstream_node = null; //upstreamNode( );
// Gets application context through Application Router
  var application_context =
getApplicationContext(rules.applications( ));
// Gets storage context from Storage Handlers through Storage
Command Router
  var initialize_storage_tag = "init storage";
  waitForSyncUpstream(initialize_storage_tag);
  var source_storage_context =
getStorageContext(application_context,
  upstream_node, //.storageContext( ), rules.storage( ));
  var destination_storage_context =
initializeStorage(source_storage_context, rules)
  notifyDownstream(initialize_storage_tag,
destination_storage_context)
  waitForSyncDownstream(initialize_storage_tag);
  notifyUpstream(initialize_storage_tag)
  // application router
  freezeApplication(application_context);
  // storage command router
  synchronizeCommand(function( ) {
createsSnapshot(destination_storage_context)
"creates snapshot");
  // application router
  thawApplication(application_context);
  // storage command router
  finalizeStorage(destination_storage_context);
  // storage command router
  synchronizeCommand(function( ) {
```

```
indexContexts(application_context,
   destination_storage_context)},
      "indexing", [application_context]);
```

In the above, for obtaining the application context information based on related rule information, there is exemplarily provided and defined the function: "getApplicationContext (rules.applications( ))".

In the above, for obtaining the storage context information based on related application context information, there is exemplarily provided and defined the function: "getStorageContext (application context, upstream_node, //.storageContext( ), rules.storage( ))".

In the above, for synchronizing the upstream and downstream nodes by synchronization points in the sequence information, there are exemplarily provided and defined the functions:

```
waitForSyncUpstream(initialize_storage tag)
waitForSyncDownstream(initialize_storage_tag)
notifyDownstream(initialize_storage_tag,
destination_storage_context) and
   notifyUpstream(initialize_storage_tag).
```

In the above, for putting on hold and resuming the related application(s), there are exemplarily provided and defined the functions:
   freezeApplication (application_context) and
   thawApplication (application_context).

In the above, for performing the synchronized snapshot as an exemplary data protection operation, there is exemplarily provided and defined the command:

```
synchronizeCommand(function( )          {
createsSnapshot(destination_storage_context)
}, "creates snapshot");
```

In the above, for performing the synchronized writing of metadata (exemplarily "indexing"), there is exemplarily provided and defined the command:

```
synchronizeCommand(function( )          {
   indexContexts(application_context,
   destination_storage_context)},
      "indexing", [application_context]);
```

Further examples for scripts which can be provided to nodes as sequence information are provided below:

1) an example script as exemplary sequence information for the operation of a sequence of mounts (mountsequence.js):

```
//
// Copyright (c) 2014 Hitachi Data Systems Inc. All rights reserved.
//
if (varifyForMount(mount_context))
{
   prepareMountContext    (storage_context,
                           mount_context);
   finalizeMountContext   (application_context,
                           storage_context,
                           mount_context);
   // only perform a file system level mount if the Application mount
fails
   if (!mountApplicationVolumes    (application_context,
                                    storage_context,
                                    mount_context))
   {
      mountVolumes(mount_context);
   }
}
```

2) an example script as exemplary sequence information for the operation of a sequence of replications (replicationsequence.js):

```
//
// Copyright (c) 2014 Hitachi Data Systems Inc. All rights reserved.
//
var application_context = null;
if (is_source)
{
   application_context = getApplicationContext(rules);
}
var storage_context;
var upstream_storage_context = (is_destination ?
upstreamnode.storageContext( ) : null);
synchronizeCommand(function( )
      {
         // modifies the global storage_context - bad practice!
         storage context = getStorageContext    (rules,
                                                 application_context);
         // in a batch case, compare the new storage context with the
replication original
         if (batch && replication_storage_context)
         {
            // replication_storage_context is expected in a batch case
            identifyReplicationDeltas(storage_context,
replication_storage_context);
         }
         initializeReplication    (rules,
                                   storage_context,
                                   upstream_storage_context);
         return [ storage_context ];
      }, "init replication");
synchronizeCommand(
   function( )
```

```
{
  startReplication(storage_context);
  return [ ];
},
"replication start");
if (is_source)
{
  // replication source side
  getApplicationIndexData           (application_context,
                                     index_record);
  // sending contexts downstream
  synchronizeContexts               ("synchronize contexts",
                                     [ application_context,
                                         index_record, ,
                                         application_configuration ] );
}
else if (is_destination)
{
  // replication destination side
  // not sending any contexts - only receiving those from the source
side
  synchronizeContexts("synchronize contexts");
  var upstream_index_record = upstreamnode.indexRecord( );
  // The upstream_index_record will be completed, but remain
unchanged in this context.
  // The fully completed IndexRecord is assigned to the local
payload.
  getStorageindexData               (storage_context,
                                     upstream_index_record);
  saveSequenceData( [               rules,
                                    upstreamnode.applicationContext( ),
                                    storage_context,
                                    upstream_storage_context ,
                                    index_record, // use the local payloads'
IndexRecord
                                    upstreamnode.applicationConfiguration( ) ] );
}
```

3) an example script as exemplary sequence information 35 for the operation of a sequence of snapshots (snapshotsequence.js):

```
//
// Copyright (c) 2014 Hitachi Data Systems Inc. All rights reserved.
//
// Gets application context through Application Router
var application_context = getApplicationContext(rules);
// Gets storage context from Storage Handlers through Storage
Command Router
// make the storage context global so it can be
var storage_context = getStorageContext          (rules,
                                                  application_context);
initializeSnapshot(rules, storage_context);
initializeApplication(application_context, storage_context);
executeCommand(prescript);
// wait until all nodes are initialized before putting the
application into backup mode
synchronizeChain("storage initialized");
enterApplicationBackupMode(application_context, storage_context);
synchronizeCommand(function( )
    {
       createSnapshot(storage_context);
       return [ ];
    },
    "create snapshot");
exitApplicationBackupMode(application_context);
executeCommand(postscript);
finalizeApplication(application_context);
finalizeSnapshot(storage_context);
// complete the index_record with application information
getApplicationIndexData(application_context,
        index_record);
// complete the index_record with storage information
getStorageIndexData(storage_context,
                                                  index_record);
// save the all contexts for the completed snapshot
```

```
saveSequenceData([ rules, application_context, storage_context,
index_record, application_configuration ]);
// Send the index_record and application context to the downstream
node
// in a synchronized snapshot instance.
if (downstreamnode)
    {
      synchronizeContexts("synchronize contexts",
                         [ index_record,
                         application_context,
                         application configuration ]);
    }
executeCommand(finalizescript);
```

4) an example script as exemplary sequence information for the operation of a synchronization (synchronization.js):

```
//
// Copyright (c) 2014 Hitachi Data Systems Inc. All rights reserved.
//
//! @param command function to execute once synchronized
//! @param block tag to use for synchronization
//! @param contexts array of contexts to pass to the downstream node
//! @param contexts array of contexts to pass to the upstream node
function synchronizeCommand(command, block_tag,
to_downstream_contexts, to_upsteam_contexts)
{
  var to_downstream_array = to_downstream contexts || [ ];
  var to_upstream_array = to_upsteam_contexts || [ ];
  if (undefined = = = synchronization || !synchronization)
  {
     (command)( );
  }
  else
  {
     waitForSyncUpstream(block_tag);
     // command must return array
     var forward_contexts = (command)( );
     to_downstream_array.concat(forward_contexts);
     notifyDownstream(block_tag, to_downstream_array);
     waitForSyncDownstream(block_tag);
     notifyUpstream(block_tag, to_upstream_array);
  }
}
//! sends the specified contexts to connected nodes
function synchronizeContexts(block_tag, to_downstream_contexts,
to_upsteam_contexts)
{
   return synchronizeCommand   (function( ) { return [ ]; },
                               block_tag,
                               to_downstream_contexts,
                               to_upsteam_contexts);
}
//! synchronizes the chain so that all nodes are prepared before
continuing
function synchronizeChain(block_tag)
{
   return synchronizeCommand   (function( ) { return [ ]; },
                               block_tag,
                               [ ],
                               []);
}
```

5) an example script as exemplary sequence information for the operation of a remote snapshots (remotesnapshotscript.js):

```
// Gets storage context from Storage Handlers through Storage
Command Router
// make the storage context global so it can be
var storage_context = getStorageContext(rules,
                                        null);
initializeSnapshot(rules, storage_context);
// loop though all volume phases
synchronizeCommand(function( )
   {
      createSnapshot(storage_context);
      return [ ];
   },
   "create snapshot");
finalizeSnapshot(storage_context);
```

```
// wait for contexts from the upstream node
synchronizeContexts("synchronize contexts", [ ]);
var index_record = upstreamnode.indexRecord( );
getStorageIndexData    (storage_context,
                        index_record);
saveSequenceData( [    rules,
                        upstreamnode.applicationContext( ),
                        storage_context,
                        index_record,
                        upstreamnode.applicationConfiguration( ) ] );
```

Figure 9:
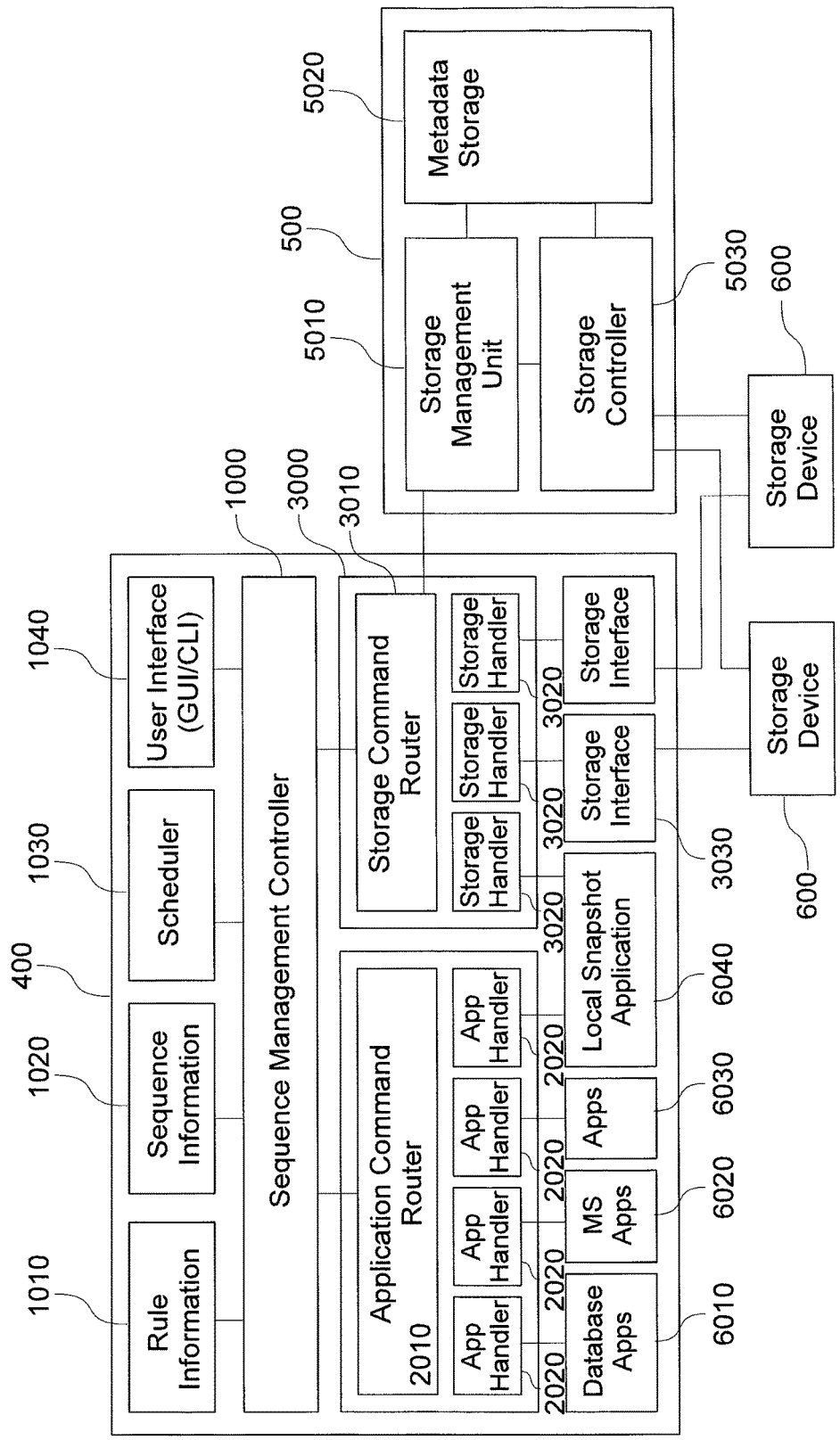
FIG. 9 exemplarily shows another schematic view of a data system architecture according to exemplary embodiments.

FIG. 9 exemplarily shows another data system architecture according to exemplary embodiments. Similar to FIG. 5, a node 400 of the data system comprises the sequence management controller 1000 (which may additionally be directly and indirectly connected to other sequence management controllers 1000 of other nodes in accordance with the above) which communicates with the scheduler 1030 and the user interface 104 and is configured to access a storage or memory to obtain the stored rule information 1010 and the stored sequence information 1020.

Further similar to FIG. 5, the sequence management controller 1000 is communicably connected to the application interface 2000 comprising the application router 2010 and plural application handlers 2020, which are communicating with applications such as one or more database applications 6010, one or more user applications 6020 (e.g. applications running on an application host), other applications 6030, and exemplarily with a local snapshot application 6040 (such as e.g. VSS for Microsoft Windows based environments, or LVM for Linux based environments). Also, the sequence management controller 1000 is communicably connected to the storage interface 3000 which comprises the storage command router 3010 and plural storage handlers 3020 to be connected via storage device interfaces to the storage devices 600.

In addition, the system according to FIG. 9 exemplarily includes a storage management server 500 which comprises a storage management unit 5010, a storage controller 5030 and, being communicably connected to both of the storage management unit 5010 and the storage controller 5030, a metadata storage unit 5020 for storing metadata on performed data protection operations under management and/or control of the storage management server 500. The storage controller 5030 is communicably connected to the storage devices 600.

In accordance with the above, the node 400 can act as a source node being an initiator of synchronized data protection operations among plural nodes of a data protection policy topology in accordance with embodiments above. Also, the node 400 may be configured to act as destination node, accepting synchronization notification and sequence initiation request from nodes being connected upstream.

When acting as a source node, the sequence management controller 1000 is configured to communicate to the applications 6010 to 6040 through the application router 2010 via the appropriate application handlers 2020, e.g. for obtaining application context information and/or for putting one or more of the applications on hold and/or resuming the applications again in accordance with embodiments above, and to communicate with the storage devices 600 and the storage management server 500 through the storage command router 3010 and the appropriate storage handlers 3020, e.g. for obtaining storage context information, and/or for instructing initialization or finalization of storage, to instruct data storage operations and/or to instruct the writing of metadata, e.g. in the metadata storage 5020 by instructing the storage management unit 5010 of the storage management server 500.

In accordance with the above, based on one or more units of sequence information 1020, e.g. based on one or more pre-selected scripts, the sequence management controller 1000 is configured to synchronize data protection operations and other actions among the application(s), the storage devices and the other nodes connected with their respective sequence management controllers 1000 to the sequence management controllers 1000 of the node 400 of FIG. 9. Such sequences enable also application specific data protection operations, e.g. in application specific phases. For example, for database application such as Oracle, data protection operations such as snapshots may be instructed in a first phase on data of the database data, and in a second phase on data of metadata and/or log data of the database management data.

Regarding the application interface 2000, the application command router 2010 is configured to receive application commands and messages from the sequence management controller 1000 and to route the commands and messages to the appropriate application handler 2020 in accordance with the designated application(s). The application handlers 2020 are configured to interface with the applications, optionally using a generic interface command protocol on the side of the sequence management controller 1000 and using application specific corresponding commands on the side of the application(s). Generic interface commands may include commands such as a command to list data paths of data related to the application(s), a command to put the application(s) on a hold and/or to resume the application(s) again, a command to obtain or request application context information, a command to obtain or request index information of an application, and/or a command to perform a post restore fixup. In addition, the application handler 2020 may be configured to interface with a local snapshot service controller (which may interface with a built-in snapshot service of the operating system of the application host, e.g. VSS for Windows based environments or LVM for Linux based environments, or the like).

Regarding the storage interface 3000, the storage command router 3010 is configured to route storage device commands to the appropriate storage device and/or the appropriate storage system comprising the storage device, or also to the storage management server 500, when appropriate. The storage command router 3010 may in some embodiments also be configured to accept commands from the user interface 1040 which may include a command line interface and/or a graphical user interface.

The storage handlers 3020 may be configured to perform operations which can only be achieved on the local machine. The storage handlers 3020 may be configured to obtain a mapping between logical paths and physical paths of data being the target of one or more data protection operations, e.g. on the basis of rule information, storage context information and/or application context information. The storage handlers 3020 can be configured to communicate directly with management controllers of storage devices or storage systems, and/or with the storage management unit 5010 of the storage management server 500 to indirectly control operations of storage devices and storage systems.

Regarding the storage management server 500, it is to be noted that the storage management server 500 may be configured to control and manage the storage for one or plural storage devices and storage systems. The storage management unit 5010 is configured to receive commands and messages from the sequence management controller 1000 via the storage command router 3010 and/or from the storage handler(s) 3020 of the storage interface 3000, and to pass the received commands and messages to the appropriate storage controller 5030. The storage controller 5030 is configured to manage virtual storage system configurations such as a system of one or more virtual storage devices (e.g. virtual machines such as VSPs or machines of VMware environments) and/or virtual storage volumes or volume groups.

Also, the storage controller 5030 may be configured to receive high level device operation commands or instructions so as to perform one or more related low level operations, for example, in case of a generic command such as "DoSnapshot(typeClone)", the storage controller 5030 controls creating relationships of volumes and/or devices, forming of replication pairs, synchronization of pairs or breaking up pair relationships. Management information and state information such as states of relationships of volumes and/or devices, and/or of created replication pairs may be stored in the metadata storage 5020. In addition, metadata on performed data protection operations such as an index of one or more instances created (e.g. snapshots) can be stored in the metadata storage 5020.

Regarding the above configuration according to FIG. 9, one or more of the following optional aspects may additionally provided.

For example, the application handler(s), the storage handler(s) which may be responsible for operations to be performed on the application host, the respective router(s), the sequence management controller(s), the rule and/or sequence information, the scheduler, and/or the user interface, e.g. for the source node, can be provided on an application host, or on a computer or server connected to an application host.

For example, the storage handler(s) 3020 can be configured to create a mapping between logical and physical storage resources, specifically for one or more specific applications, and the storage handler(s) 3020 can be configured to pass management and control of data protection operations to the storage management server 500. The storage handler(s) 3020 may use a utility library, and only entry points may need to be implemented.

The storage controller(s) 5030 may be implemented on the storage management server 500, and may be configured to process high level commands (for example: DoSnapshot, IndexSnapshot, PrimReplication, RemoveSnapshot, etc.) which are defined such as to include one or more low level commands involved in one or more data protection operations, and it may interface with the storage devices and storage systems. The storage controller(s) 5030 may retrieve storage context information created by the storage handler(s) 3020 and/or the sequence management controller 1000. The storage controller(s) 5030 may use a utility library, and only entry points may need to be implemented.

As will be appreciated by one of skill in the art, the present invention, as described hereinabove and the accompanying figures, may be embodied as a method (e.g., a computer-implemented process, a business process, or any other process), apparatus (including a device, machine, system, computer program product, and/or any other apparatus), or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires.

Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments of the invention described herein may be combined to form other embodiments of the invention.

The invention claimed is:

1. A data system for managing synchronized data protection operations at plural nodes of the data system, comprising:

one or more physical devices which provide resources that configure the plural nodes which include a node chain including at least a first node, a second node downstream of the first node, and a third node downstream of the second node in the node chain, and the first node being communicably connected to the second node, and the second node being communicably connected to the third node, the first node receiving data from an application host, wherein the resources are configured to store data associated with an application running on the application host, wherein the first node is configured to operate on the basis of first sequence information including instructions of a sequence of operations to be executed by the first node for performing a first data protection operation and for synchronizing the sequence of operations to be executed by the first node with the second node and the third node, wherein the second node is configured to operate on the basis of second sequence information including instructions of a sequence of operations to be executed by the second node for performing a second data protection operation and for synchronizing the sequence of operations to be executed by the second node with the first node and the third node, wherein the third node is configured to operate on the basis of third sequence information including instructions of a sequence of operations to be executed by the third node for performing a third data protection operation and for synchronizing the sequence of operations to be executed by the third node with the first node and the second node, wherein the first node is configured to put the application into a hold on the basis of a respective instruction included in the first sequence information, wherein the first, second and third data protection operations relate to data associated with the application running on the application host, and after the first node, second node and third node each initiate their sequence of operations, respectively, the first node is configured to request to the application, on the basis of a respective instruction included in the first sequence information and before putting the application on hold, application context information which indicates one or more logical storage locations of data related to the application, wherein the first node is configured to request, on the basis of a respective instruction included in the first sequence information and before putting the application on hold, storage context information which indicates one or more physical storage locations, of storage areas of the first node, of data related to the application associated with the one or more logical storage locations indicated in the application context information, wherein the first node is configured to, when needed, translate the application context information into the requested storage context information, which indicates one or more physical storage locations, of the storage areas of the first node, of data related to the application associated with the one or more logical storage locations indicated in the application context information, on the basis of a respective instruction included in the first sequence information and on the basis of the application context information, and to transmit the generated storage context information to the second node, wherein the first node is configured to transmit, on the basis of a respective instruction included in the first sequence information and before putting the application on hold, the requested application context information to the second node, wherein the second node is configured to request, on the basis of a respective instruction included in the second sequence information, storage context information which indicates one or more physical storage locations, of storage areas of the second node, of data related to the application associated with the one or more logical storage locations indicated in the application context information, wherein the second node is configured to transmit, on the basis of a respective instruction included in the second sequence information and before putting the application on hold, the requested application context information to the third node, wherein the third node is configured to request, on the basis of a respective instruction included in the third sequence information, storage context information which indicates one or more physical storage locations, of storage areas of the third node, of data related to the application associated with the one or more logical storage locations indicated in the application context information, wherein the first node, the second node and the third node are each configured to perform the first data protection operation, the second data protection operation and the third data protection operation, respectively, after putting the application into the hold, wherein the first node is configured to perform the first data protection operation, after the first application is put into the hold, and to then transmit a first synchronization notification to the second node on the basis of respective instructions included in the first sequence information, wherein the second node is configured to receive the first synchronization notification from the first node, perform the second data protection operation in response to the first synchronization notification from the first node, and to then transmit a second synchronization notification to the third node on the basis of respective instructions included in the second sequence information, wherein the third node is configured to receive the second synchronization notification from the second node and perform the third data protection operation in response to the received second synchronization notification from the second node, wherein the third node is further configured to transmit a first confirmation notification to the second node when having performed the third data protection operation on the basis of a respective instruction included in the third sequence information, wherein the second node is further configured to transmit a second confirmation notification to the first node when having performed the second data protection operation and having received the first confirmation notification from the third node on the basis of a respective instruction included in the second sequence information, and wherein the first node is configured to resume the application upon receiving the second confirmation notification from the second node on the basis of a respective instruction included in the first sequence information.

2. The data system according to claim 1, wherein the first node is further configured, after performing the first data protection operation and after resuming the application, to request writing metadata indicative of actions of the first data protection operation and to transmit a third synchronization notification to the second node on the basis of respective instructions included in the first sequence information.

3. The data system according to claim 2, wherein the second node is configured to receive the third synchronization notification from the first node, and to request writing metadata indicative of actions of the second data protection operation upon receipt of the third synchronization notification and to transmit a third confirmation notification to the first node on the basis of respective instructions included in the second sequence information.

4. The data system according to claim 1, wherein each of the first, second and third data protection operations includes one or more of: a backup operation, a mirror operation, a snapshot operation, a versioning operation, an archiving operation, and a replicate operation.

* * * * *